United States Patent
Jiang et al.

(10) Patent No.: US 12,418,660 B2
(45) Date of Patent: Sep. 16, 2025

(54) SYSTEMS AND METHODS FOR STRING VIDEO CODING

(71) Applicant: ZHEJIANG DAHUA TECHNOLOGY CO., LTD., Zhejiang (CN)

(72) Inventors: Dong Jiang, Hangzhou (CN); Cheng Fang, Hangzhou (CN); Xue Zhang, Hangzhou (CN); Jucai Lin, Hangzhou (CN); Jun Yin, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 179 days.

(21) Appl. No.: 18/328,758

(22) Filed: Jun. 4, 2023

(65) Prior Publication Data
US 2023/0319287 A1    Oct. 5, 2023

Related U.S. Application Data

(63) Continuation of application No. PCT/CN2021/135831, filed on Dec. 6, 2021.

(30) Foreign Application Priority Data

Dec. 6, 2020  (CN) .......................... 202011419495.3
Apr. 15, 2021  (CN) .......................... 202110405425.0

(51) Int. Cl.
*H04N 19/139*  (2014.01)
*G06V 10/74*   (2022.01)
*H04N 19/172*  (2014.01)

(52) U.S. Cl.
CPC ......... *H04N 19/139* (2014.11); *G06V 10/761* (2022.01); *H04N 19/172* (2014.11)

(58) Field of Classification Search
CPC .................................................. H04N 19/00
See application file for complete search history.

(56) References Cited

U.S. PATENT DOCUMENTS

| | | | |
|---|---|---|---|
| 2013/0011059 | A1 | 1/2013 | Ström et al. |
| 2015/0172663 | A1 | 6/2015 | Kim et al. |

(Continued)

FOREIGN PATENT DOCUMENTS

| | | | |
|---|---|---|---|
| CN | 104244007 | A | 12/2014 |
| CN | 107483961 | A | 12/2017 |

(Continued)

OTHER PUBLICATIONS

International Search Report in PCT/CN2021/135831 mailed on Feb. 24, 2022, 4 pages.

(Continued)

*Primary Examiner* — Kyle M Lotfi
(74) *Attorney, Agent, or Firm* — Metis IP LLC

(57) ABSTRACT

The present disclosure relates to systems and methods for video encoding. The systems may determine a current string in a coding unit (CU) of an image frame. The current string may include one or more pixels. The systems may determine, based on a first pixel in the current string, a reference matching pixel of the first pixel by searching a searching area. The searching area may include a plurality of matching pixels The systems may determine, based on the reference matching pixel and matching patterns, a count of matching pixels in each of a plurality of groups, corresponding to the matching patterns, of the current string. The systems may further determine, based on counts of matching pixels in the plurality of groups corresponding to the matching patterns, a target prediction of the current string.

17 Claims, 16 Drawing Sheets

Matching string

New matching string

(56) References Cited

U.S. PATENT DOCUMENTS

| | | | |
|---|---|---|---|
| 2016/0100174 | A1 | 4/2016 | Yu et al. |
| 2016/0330455 | A1 | 11/2016 | Lin et al. |
| 2017/0295376 | A1 | 10/2017 | Lee et al. |
| 2020/0162743 | A1* | 5/2020 | Park ................. H04N 19/513 |
| 2020/0280718 | A1 | 9/2020 | Lin et al. |
| 2021/0014530 | A1 | 1/2021 | Ando |
| 2022/0417504 | A1 | 12/2022 | Wang et al. |

FOREIGN PATENT DOCUMENTS

| | | | |
|---|---|---|---|
| CN | 110087090 | A | 8/2019 |
| CN | 111447454 | A | 7/2020 |
| CN | 111586416 | A | 8/2020 |
| CN | 112565749 | A | 3/2021 |
| CN | 112565753 | A | 3/2021 |
| CN | 112565760 | A | 3/2021 |
| CN | 113347437 | A | 9/2021 |
| GB | 2527354 | A | 12/2015 |

OTHER PUBLICATIONS

Written Opinion in PCT/CN2021/135831 mailed on Feb. 24, 2022, 5 pages.
First Office Action in Chinese Application No. 202110405425.0 mailed on Jun. 28, 2022, 15 pages.
Telecommunication Standardization Sector of ITU, ITU-T H.265, 2015, 635 pages.
Lin, Tao et al., Screen Content Coding with Primary and Secondary Reference Buffers for String Matching and Copying, Research Papers, 53-60 , 2015.
Zhao, Liping et al., A Universal String Matching Approach to Screen Content Coding, Ieee Transactions on Multimedia, 20: 796-809, 2018.
Zhou, Kailun et al., A Flexible and Uniform String Matching Technique for General Screen Content Coding, Multimed Tools Appl, 77: 23751-23775, 2018.
Zhang, Kai et al., Symmetric Intra Block Copy, Joint Collaborative Team on Video Coding (JCT-VC) of ITU-T SG 16 WP 3 and ISO/IEC JTC 1/SC 29/WG 11 17th Meeting: Valencia, ES, 2014, 8 pages.
The Extended European Search Report in European Application No. 21900135.1 mailed on Mar. 5, 2024, 10 pages.

* cited by examiner

Adjacent LUC located at a left side of the current LCU

Current LUC

Adjacent LUC located at a left side of the current LCU

Current LUC

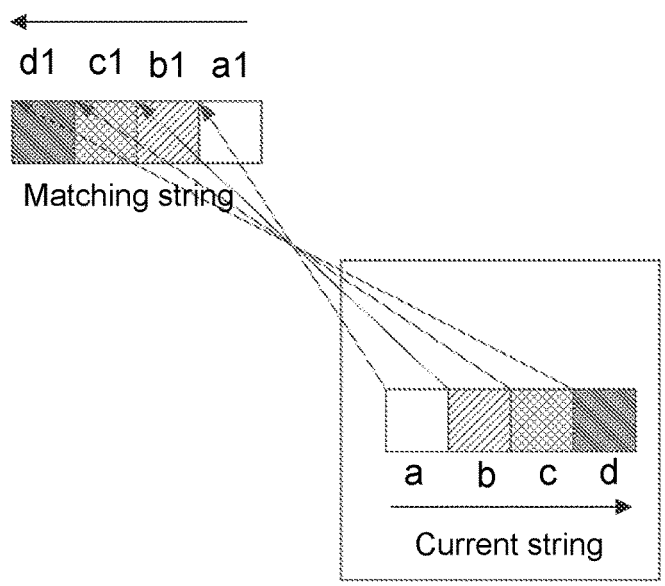
FIG. 4A
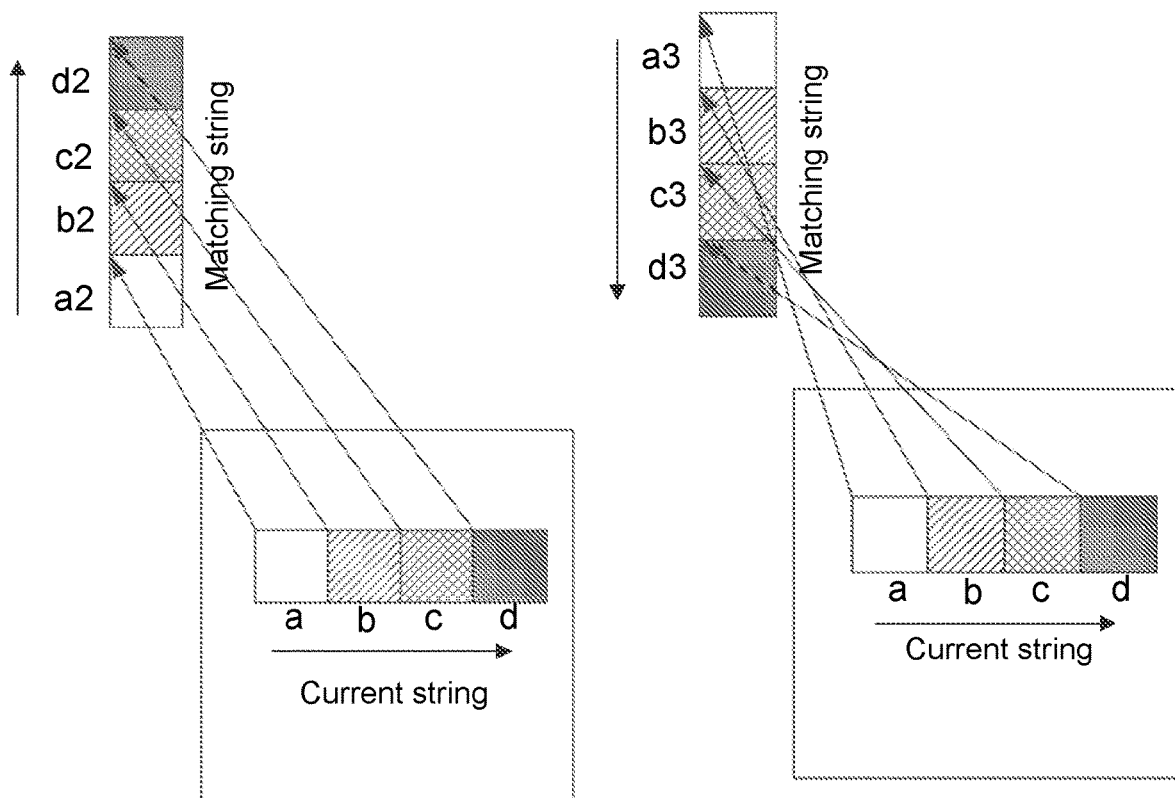
FIG. 4B
FIG. 4C

SYSTEMS AND METHODS FOR STRING VIDEO CODING

CROSS-REFERENCE TO RELATED APPLICATIONS

This application is a Continuation of International Application No. PCT/CN2021/135831 filed on Dec. 6, 2021, which claims priority to Chinese Patent Application No. 202011419495.3, filed on Dec. 6, 2020, Chinese Patent Application No. 202110405425.0, filed on Apr. 15, 2021, the contents of each of which are incorporated herein by reference in their entirety.

TECHNICAL FIELD

The present disclosure generally relates to video data processing technology, and in particular, to systems and methods for video encoding.

BACKGROUND

Due to the amount of video image data being relatively large, video pixel data usually needs to be compressed. The compressed data is a video code stream. The video code stream is transmitted to a user terminal through a wired network or a wireless network and further decoded for display. A video coding process includes prediction, transformation, quantization, coding, or the like. For string prediction (SP), a bit estimation manner is not aligned during the video coding process, and string vector (SV) candidates are insufficient at an encoding end, which affects the accuracy of the SV selected from the SV candidates, thereby affecting the compression rate of SP.

Therefore, it is desirable to provide systems and methods for string prediction to improve the compression rate of string prediction.

SUMMARY

An aspect of the present disclosure relates to a method for video encoding. The method may include determining a current string in a coding unit (CU) of an image frame. The current string may include one or more pixels. The method may include determining, based on a first pixel in the current string, a reference matching pixel of the first pixel by searching a searching area. The searching area may include a plurality of matching pixels. The method may include determining, based on the reference matching pixel and matching patterns, a count of matching pixels in each of a plurality of groups, corresponding to the matching patterns, of the current string. The method may further include determining, based on counts of matching pixels in the plurality of groups corresponding to the matching patterns, a target prediction of the current string.

In some embodiments, the matching patterns may include a horizontal matching pattern, a vertical matching pattern, and/or a diagonal matching pattern.

In some embodiments, the matching patterns may include a flip pattern. The determining the target prediction of the current string may include obtaining at least one flipped matching string by adjusting a position of at least one of matching pixels in the target prediction of the current string based on the flip pattern, the flip pattern including at least one of a symmetric flip pattern, a multi-axis flip pattern, or a complete flip pattern; comparing a first cost between the current string and the target prediction of the current string with a second cost between the current string and the at least one flipped matching string; and selecting, based on the comparison, one corresponding to the smallest of the first cost and the second cost from the target prediction and the at least one flipped matching string as the target prediction of the current string.

In some embodiments, the flip pattern is the symmetric flip pattern. The adjusting the position of at least one of matching pixels in the target prediction of the current string based on the flip pattern may include selecting a matching pixel in the target prediction of the current string as a flip axis; flipping one or more pixels in the target prediction located at a first side of the flip axis to a second side of the flip axis; and flipping one or more pixels in the target prediction located at the second side of the flip axis to the first side of the flip axis.

In some embodiments, the flip pattern is the multi-axis flip pattern. The adjusting the position of at least one of matching pixels in the target prediction of the current string based on the flip pattern may include selecting a plurality of discontinuous matching pixels in a same pixel row of the target prediction of the current string as flip axes; flipping a part of matching pixels between two adjacent flip axes in the flip axes according to one of the two adjacent flip axes close the part of pixels; and flipping the other part of matching pixels between the two adjacent flip axes according to the other of the two adjacent flip axes.

In some embodiments, the flip pattern is the complete flip pattern. The adjusting the position of at least one of matching pixels in the target prediction of the current string based on the flip pattern may include reversing completely an order of matching pixels in the target prediction of the current string.

In some embodiments, the determining the count of matching pixels of the current string may include determining, based on the reference matching pixel, the matching patterns, and costs, the count of matching pixels in each of the plurality of groups, corresponding to the matching patterns, of the current string.

In some embodiments, one of the costs corresponding to the current string is at a CU level and determined by selecting a string vector (SV) of the current string, and determining, in response to that the selected SV of the current string is in a historical candidate motion vector list, a bit cost of the SV of the current string using an index of the SV in the historical candidate motion vector list.

In some embodiments, one of the costs corresponding to the current string is at a CU level and determined by weighting a bit cost based on a lamda weighting factor.

In some embodiments, one of the costs corresponding to the current string is at an ordinary level and determined based on a first parameter offset1.

In some embodiments, the determining the count of matching pixels of the current string may include obtaining candidate motion vectors; constructing a predicted motion vectors candidate list using the candidate motion vectors; determining, based on the reference matching pixel and the matching patterns, a string vector (SV) of the current string using the predicted motion vectors candidate list; determining the costs of the SV of the current string; and determining the count of matching pixels of the current string based on the costs.

In some embodiments, the candidate motion vectors include a motion vector in an adjacent domain, a motion vector in a non-adjacent spatial domain, a motion vector during an encoding process, and/or a preset motion vector. The motion vector may include a block vector and/or a string vector.

In some embodiments, the candidate motion vectors may include motion vectors in a final historical candidate list under a best division manner of a largest coding unit corresponding to the current string and temporary historical candidate lists under other division manners of the largest coding unit.

In some embodiments, the method may further include encoding the current string based on the target prediction.

In some embodiments, the current string may be at a CU level. The encoding the current string based on the target prediction may include obtaining a horizontal component and a vertical component of an SV associated with the target prediction of the current string at the CU level; determining whether the vertical component of the SV of the current string is less than 1 and the horizontal component of the SV of the current string is equal to 0; in response to determining that the vertical component of the SV of the current string is not less than 1 and/or the horizontal component of the SV of the current string is not equal to 0, determining whether the vertical component of the SV of the current string is non-zero; and in response to determining that the vertical component of the SV of the current string is 0, encoding a difference between an absolute value of the horizontal component of the SV of the current string and a second parameter offset2. In response to that a length of the current string is less than a width of the CU corresponding to the current string, the second parameter offset2 may be equal to the length of the current string. In response to that the length of the current string is greater than or equal to the width of the CU, the second parameter offset2 may be equal to the first parameter offset1 plus 1. The first parameter offset1 may be less than or equal to the absolute value of the horizontal component of the SV of the current string and the width of the CU.

In some embodiments, the current string may be at an ordinary level. The encoding the current string based on the target prediction may include obtaining a horizontal component and a vertical component of an SV associated with the target prediction of the current string at the ordinary level; determining whether the vertical component of the SV of the current string is less than 1 and the horizontal component of the SV of the current string is equal to 0; in response to determining that the vertical component of the SV of the current string is not less than 1 and/or the horizontal component of the SV of the current string is not equal to 0, determining whether the vertical component of the SV of the current string is non-zero; and in response to determining that the vertical component of the SV of the current string is 0, determining whether an index of a pixel row where a starting position of the current string is located is an odd number; in response to determining that the index of the pixel row where the starting position of the current string is located is not an odd number, encoding a difference between an absolute value of the horizontal component of the SV of the current string and a second parameter offset2. In response to that a length of the current string is less than a width of the CU corresponding to the current string, the second parameter offset2 may be equal to the length of the current string. In response to that the length of the current string is greater than or equal to the width of the CU, the second parameter offset2 may be equal to the first parameter offset1 plus 1. The first parameter offset1 may be less than or equal to the absolute value of the horizontal component of the SV of the current string and the width of the CU.

In some embodiments, the current string may be a cross-line string that includes at least two pixel rows. The encoding the current string based on the target prediction may not include encoding and transmitting a syntactic element corresponding to a unit basis vector of the current string.

A further aspect of the present disclosure relates to a system for video encoding. The system may include at least one storage device including a set of instructions and at least one processor in communication with the at least one storage device. When executing the set of instructions, the at least one processor may be directed to cause the system to implement operations. The operations may include determining a current string in a coding unit (CU) of an image frame. The current string may include one or more pixels. The operations may include determining, based on a first pixel in the current string, a reference matching pixel of the first pixel by searching a searching area. The searching area may include a plurality of matching pixels. The operations may include determining, based on the reference matching pixel and matching patterns, a count of matching pixels in each of a plurality of groups, corresponding to the matching patterns, of the current string. The operations may further include determining, based on counts of matching pixels in the plurality of groups corresponding to the matching patterns, a target prediction of the current string.

A still further aspect of the present disclosure relates to a system for video encoding. The system may include a determining module, a searching module, a matching module, and a predicting module. The determining module may be configured to determine a current string in a coding unit (CU) of an image frame. The current string may include one or more pixels. The searching module may be configured to determine, based on a first pixel in the current string, a reference matching pixel of the first pixel by searching a searching area. The searching area may include a plurality of matching pixels. The matching module may be configured to determine, based on the reference matching pixel and matching patterns, a count of matching pixels in each of a plurality of groups, corresponding to the matching patterns, of the current string. The predicting module may be configured to determine, based on counts of matching pixels in the plurality of groups corresponding to the matching patterns, a target prediction of the current string.

A still further aspect of the present disclosure relates to a non-transitory computer readable medium including executable instructions. When the executable instructions are executed by at least one processor, the executable instructions may direct the at least one processor to perform a method. The method may include determining a current string in a coding unit (CU) of an image frame. The current string may include one or more pixels. The method may include determining, based on a first pixel in the current string, a reference matching pixel of the first pixel by searching a searching area. The searching area may include a plurality of matching pixels. The method may include determining, based on the reference matching pixel and matching patterns, a count of matching pixels in each of a plurality of groups, corresponding to the matching patterns, of the current string. The method may further include determining, based on counts of matching pixels in the plurality of groups corresponding to the matching patterns, a target prediction of the current string.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4A is a schematic diagram illustrating matching of a current string and a matching string when the matching string is arranged in an order from right to left according to some embodiments of the present disclosure;

FIG. 4B is a schematic diagram illustrating matching of a current string and a matching string when the matching string is arranged in an order from bottom to top according to some embodiments of the present disclosure;

FIG. 4C is a schematic diagram illustrating matching of a current string and a matching string when the matching string is arranged in an order from top to bottom according to some embodiments of the present disclosure;

DETAILED DESCRIPTION

Figure 1:
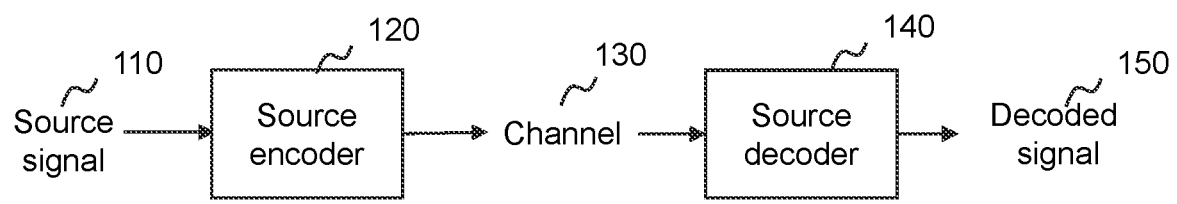
FIG. 1 is a schematic diagram illustrating a video processing process according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It should be understood that the term "coding unit" used herein refers to a basic unit of image processing or a specific position in an image. In addition, in the description of the present disclosure, the term "unit" includes all concepts of coding unit, prediction unit, and transformation unit.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a schematic diagram illustrating a video processing process according to some embodiments of the present disclosure.

In some embodiments, a video encoding system 100 may be applied to a digital image/video compression system, such as air television broadcasting, cable television transmission, satellite television transmission, such as an aerial TV broadcasting system, a cable TV transmission system, a satellite TV transmission system, an Internet video transmission system, a digital video stored in media, or the like. As used herein, image/video compression refers to a process of reducing the amount of data required to present the digital images/videos. The purpose of the image/video compression may be to reduce redundant information in image/video data so as to store and transmit data effectively.

As shown in FIG. 1, the video encoding system 100 may include a source signal 110, a source encoder 120, a channel 130, a source decoder 140, and a decoded signal 150.

In some embodiments, the source signal 110 may include source image data. In some embodiments, the source image data may refer to uncompressed original image data that has not been processed by a digital image editing and compression application. The source image data may include one or more source images, a source video, etc. A source image may include a video tape, a laser disk, a dynamic script, a digital image file, or the like. The source video may refer to uncompressed dynamic images, and a storage format of the source video may include a digital video format.

In some embodiments, the source encoder 120 may refer to a signal compression standard completed by software and/or hardware applications. The source encoder 120 may be configured to compress a source signal (e.g., a source image, a source video) at a sending end to obtain an encoded source signal.

In some embodiments, the source encoder 120 may predict and encode the source signal. Specifically, the source encoder 120 may predict, based on one or more previous source signals that have been encoded before a source signal, the source signal to obtain a prediction value of the source signal. Further, the source encoder 120 may encode a difference between an original value and the prediction value of the source signal.

In some embodiments, the prediction may include a string prediction (SP). The SP may refer to the prediction of several consecutive pixels in a current block (also referred to as a current CU). A scanning manner associated with the SP may be shown elsewhere in the present disclosure, for example, FIG. 2C and relevant descriptions thereof. The scanning manner may be set according to actual application needs, which is not limited herein.

In some embodiments, the video encoding system 100 may further include a channel encoder. The channel encoder may refer to a device or program that may further encode an encoded source signal before channel transmission at the sending end. The channel encoder may be configured to perform an error correction.

In some embodiments, the channel 130 may transmit or store encoded image/video data. The channel 130 may include a wireless channel, a wired channel, or a frequency band. The channel 130 may include a twisted pair, a cable, an optical fiber, or a medium that may propagate electromagnetic waves.

In some embodiments, the encoded image data may be stored in a storage device (e.g., a hard disk), and the encoded image data may be read from the storage device during a subsequent decoding processing process.

In some embodiments, the video encoding system 100 may include a channel decoder. The channel decoder may be configured at a receiving end to detect and correct an error in data transmission. The encoded source signal may be unzipped by a source decoder 140.

In some embodiments, the source decoder 140 may refer to a signal compression standard completed by software or hardware applications. The source decoder 140 may be configured to generate an approximation of the source signal (e.g., a source image or a source video) in a decoding end for playback. For example, the source decoder 140 may be configured to obtain an approximation of the source signal by decoding the encoded source signal.

In some embodiments, the decoded signal 150 may refer to data reconstructed from the source signal 110 after being encoded and decoded. The decoded signal 150 may include image data after being compressed and decompressed.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2A:
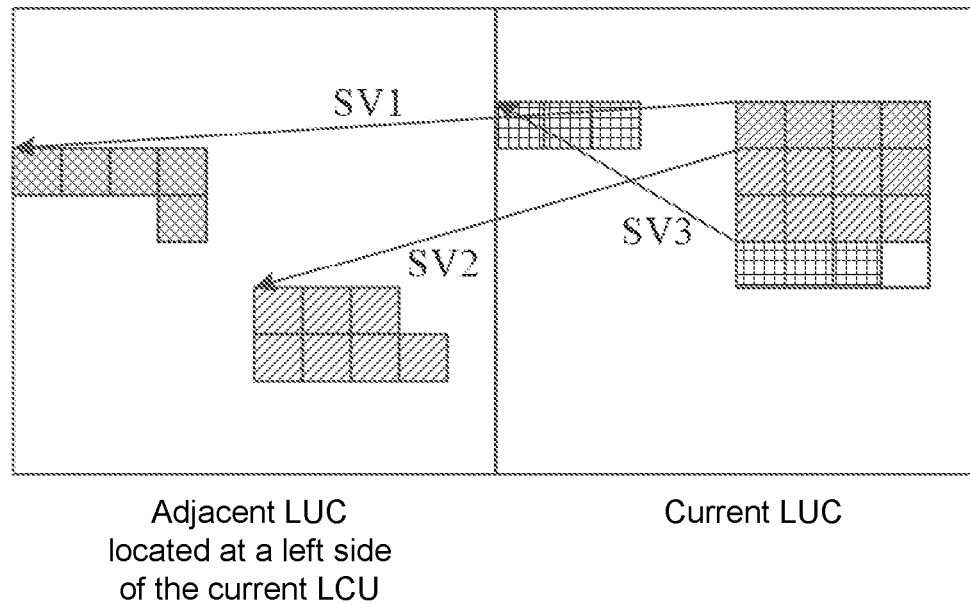
FIG. 2A is a schematic diagram illustrating a string prediction pattern of an ordinary level string according to some embodiments of the present disclosure.

FIG. 2A is a schematic diagram illustrating a string prediction pattern according to some embodiments of the present disclosure.

When a video is encoded, the input may be a plurality of image frames. When each image frame is encoded, the image frame may need to be divided into several largest coding units (LCUs). Further, each largest coding unit may be divided into coding units (CUs) with different sizes. Video coding may be performed in units of CU.

A color coding manner in video coding may include YUV (Y represents luminance (that is, a gray value of an image), U and V represent chrominance that is used to describe the color and saturation of the image), RGB (R represents red, G represents green, and B represents blue), etc. The color coding manner used in the present disclosure is YUV. Each Y luminance block may correspond to a U chrominance block and a V chrominance block. Each of the U chrominance block and the V chrominance block may correspond to only one Y luminance block. Taking a sampling format of 4:2:0 as an example, a size of a luminance block corresponding to a coding block with a size of N*M may be N*M, and sizes of the two chrominance blocks corresponding to the block may be both (N/2)*(M/2). That is, a ratio of the size of any one of the two chrominance blocks to the size of the luminance block may be ¼.

The present disclosure is related to a history based block vector prediction (HBVP) list. The HBVP list may include block vectors (BVs) or string vectors (SVs) of historically encoded blocks using an Intra Block Copy (IBC) technique or an SP technique and the related information. When the encoding of a frame starts, the HBVP list may be empty. After the prediction of each CU is completed and the IBC pattern or SP pattern used is determined, related information of the IBC pattern and the SP pattern may be inserted into the HBVP list based on a principle of first-in-first-out.

The present disclosure is related to an SP technique. SP is an independent prediction technique, which aims at a situation where different areas in an image frame have similar image content. The SP technique may include two patterns including an ordinary SP pattern and an equal value string unit basis vector string (evs_ubvs) prediction pattern.

The present disclosure is related to the ordinary SP pattern. In the ordinary SP pattern, continuous n pixels (n≥1) in a current block may form a string (also referred to as a pixel string). The current block may include several different strings, and each string may have a string vector (SV). The SV may point to a coded pixel (i.e., a reference pixel) in a spatial domain. If pixels in the current block cannot form a string, pixel values of the pixels may be encoded directly. A schematic diagram of string matching is shown in FIG. 2A. Different filling types may correspond to three strings (the pixel values in the same string may not be the same necessarily), respectively. The string vectors corresponding to the three strings are SV1-SV3, respectively. A pixel in the current block does not form a string, and the pixel value of the pixel may be encoded directly.

Detailed operations using an SP technique may be described as follows. The operations using an SP technique may be associated with (1) application conditions, (2) motion estimation, (3) motion compensation, (4) syntactic element, etc.

(1) application conditions of an SP technique: the SP technique may be applied to a luminance block with a width and a height both greater than or equal to 4 and less than or equal to 32. For small blocks (the luminance blocks with a width and a height both less than 4), if the small blocks generate color blocks with a side length less than 4 after being further divided, the color blocks may not be further divided, and the prediction of the small blocks may not adopt the SP pattern, but adopt a traditional intra prediction pattern.

(2) motion estimation: the purpose of the motion estimation may be to find an optimal motion vector of the current block, which may be obtained through motion searching at a CU level (also referred to as CU-level motion searching for brevity) and motion searching at a pixel level (also referred to as pixel-level motion searching for brevity) at the same time. Specifically, the CU-level motion searching may be performed first. If a matching block of the current block is not found, the pixel-level motion searching may be performed.

(2-1) The motion estimation may include the CU-level motion searching. The CU-level motion searching may include operations including 211, 213, 215, and 217 as described follows.

Figure 2B:
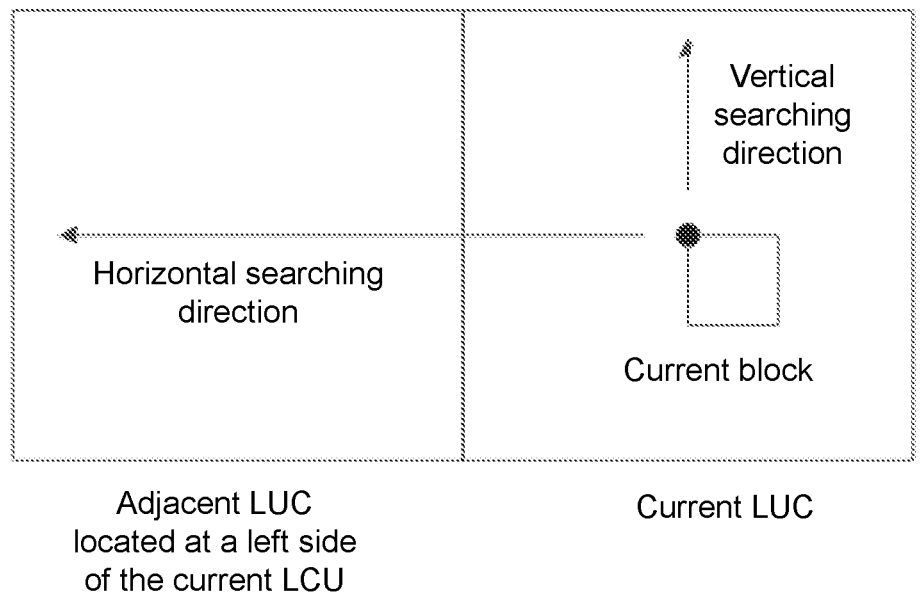
FIG. 2B is a schematic diagram illustrating a motion searching at a coding unit (CU) level according to some embodiments of the present disclosure.

In 211, a searching area may be set. A searching direction of the CU-level motion searching may be horizontal to the left and vertical upwards along an upper left corner (e.g., a black dot in FIG. 2B) of the current block. During the CU-level motion, a topside of the searching area may not exceed a top boundary of a current LCU where the current block is located, and a left side of the searching area may not exceed a left boundary of an adjacent LCU located at a left side of the current LCU. In addition, a CU block pointed to by a motion vector in the HBVP list may be used as a matching block for cost calculation.

In 213, a matching block of the current block may be selected. For a luminance block, a block with the same size as the current block may be searched within the searching area as the matching block of the current block. The searched block needs to be an encoded block. The searching may be performed in the vertical direction first and then in the horizontal direction. Further, a sum of absolute differences (SAD) between the current block and the searched block may be calculated. Up to 8 smallest SADs may be selected to form a SAD list. The SAD list may be recorded in ascending order, and accordingly, a list (also referred to as a difference list for brevity) of coordinate differences each of which is between coordinates of upper left corners of the searched block and the current block corresponding to a SAD may be recorded. A coordinate difference between coordinates of an upper left corner of the searched block and the current block corresponding to a SAD may be used as an SV.

For a color block, if the difference list exists and a SAD corresponding to a difference of a first order in the difference list is less than or equal to 32, the SAD list and the difference list may need to be traversed, and a total SAD of three components (e.g., a luminance component, Cb and Cr chrominance components) may need to be recalculated. A difference in the difference list corresponding to the smallest SAD may be used as the coordinate difference (i.e., as the SV, which points to the matching block of the current block) between the current block and the matching block. If the difference list exists and the SAD corresponding to the difference of the first order in the difference list is larger than 32, the difference of the first order in the difference list corresponding to the SAD may be used as the coordinate difference (i.e., as the SV, which points to the matching block of the current block) between the current block and the matching block.

In 215, a reconstructed block may be obtained. An obtained matching block may be the reconstructed block. Further, a rate-distortion cost (rdcost) of the current block and the reconstructed block may be calculated using a Sum of Squares (SSE). A bit cost in the rdcost may be a bit consumed by the coordinate difference between the current block and the matching block.

In 217, information may be saved. If the rdcost in the current SP pattern is less than a rdcost in a previous optimal prediction pattern, a matching flag in the current SP pattern, the coordinate difference between the current block and the matching block, a count of matched pixels in each of matching strings corresponding to pixel strings in the current block, and a type of each matching string may be saved.

(2-2) The pixel-level motion searching may include operations 221, 223, 225 as follows.

Figure 2C:
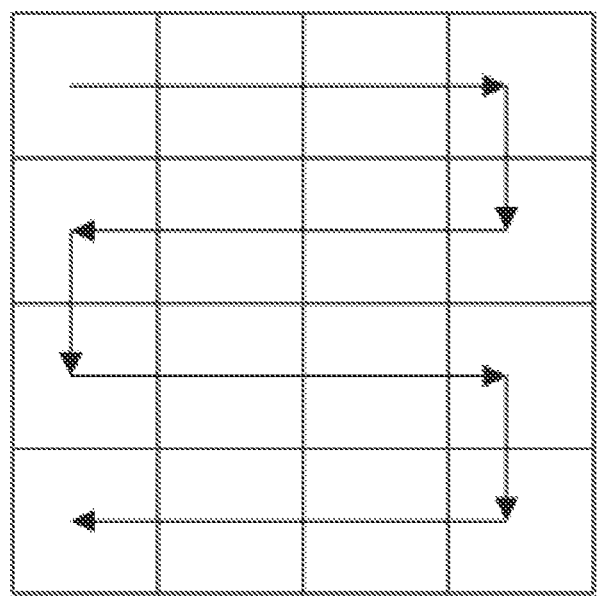
FIG. 2C is a schematic diagram illustrating a scanning manner of pixels in a current string according to some embodiments of the present disclosure.

In 221, a scanning manner (also referred to as a searching manner) of pixels in pixel-level motion searching may be obtained. The scanning manner of the pixel-level motion searching may be a horizontal arc scanning as shown in FIG. 2C.

In 223, a motion searching candidates may be constructed. When the scanning is performed in a horizontal direction, the motion searching candidates may include putting a vertical direction first, a corresponding motion vector is (0, −1); putting the horizontal direction, a corresponding motion vector is (−1, 0); putting an optimal motion vector (MV) under an intra block copy (IBC) pattern; putting historical motion vectors (a count of the historical motion vectors is up to 12); putting motion vectors of a current pixel and all reconstructed pixels whose HASH values are equal to a HASH value of the current pixel and are within the searching area (the motion vector corresponding to the last reconstructed pixel may be put first, and the motion vector corresponding to the earliest reconstructed pixel may be put behind). The searching area may not exceed the current LCU and the adjacent LCU located at the left side of the current LCU.

Figure 2D:
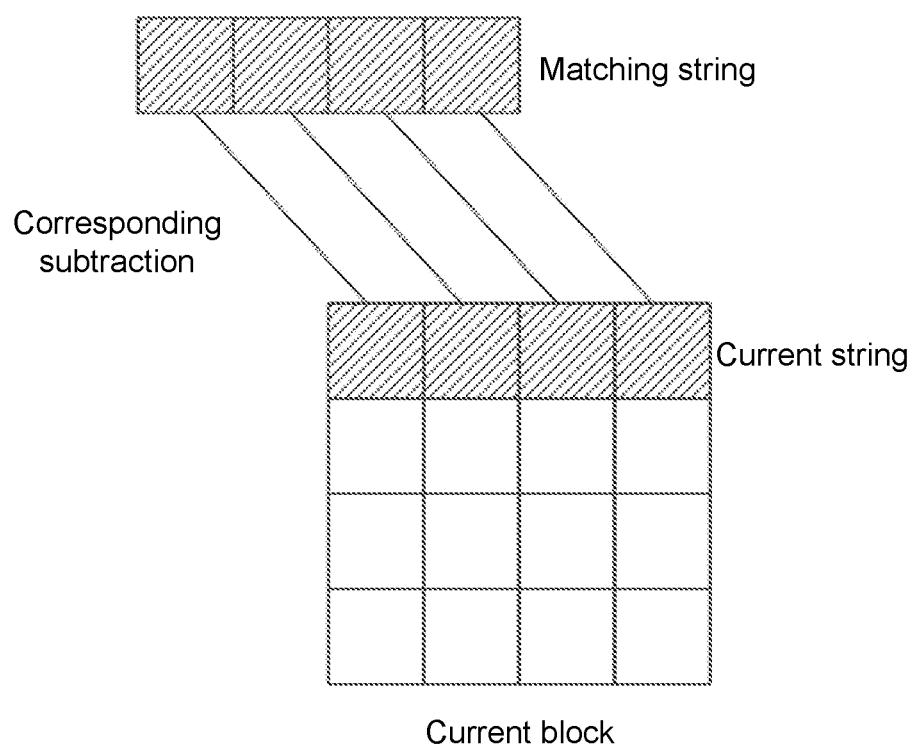
FIG. 2D is a schematic diagram illustrating matching at a pixel level according to some embodiments of the present disclosure.

In 225, a matching string may be selected. When the searching manner is determined, for the luminance component, each motion searching candidate may be traversed. When the current motion searching candidate is operated, a matching operation may need to be performed on the current pixel and subsequent consecutive pixels of the current pixel using the current motion searching candidate. A threshold may be arranged. The threshold may be related to a quantization parameter (QP). The greater the QP is, the greater the threshold may be. If differences each of which is between an original pixel value of one of the consecutive pixels and a reference pixel (also referred to as a matching pixel) corresponding to the one of the consecutive pixels are less than the threshold, a count (i.e., a length of a string) of the consecutive pixels under the motion searching candidate may be recorded as shown in FIG. 2D.

In some embodiments, a selection of an optimal motion searching candidate may include a rough selection based on a comparison of string lengths. If a string length under the current motion searching is greater than or equal to a string length under a previous optimal motion searching minus 1, the current motion searching may be selected, and a total cost of the current string may be calculated. If the string length under the current motion searching is less than the string length under the previous optimal motion searching minus 1, the current motion searching may be eliminated directly.

In some embodiments, a selection of an optimal motion searching candidate may include a fine selection based on the string length and a cost. If one of the following three conditions is satisfied, the current motion searching may be designated as the optimal motion searching. The three conditions include:

(i) the string length under the current motion searching is greater than or equal to the string length under the previous optimal motion searching;

(ii) the string length under the current motion searching is equal to the string length under the previous optimal motion searching, the current string length is not 0, and a cost of the current string is less than a cost of a string under the previous optimal motion searching; and (iii) the string length under the current motion searching is equal to a difference between the string length under the previous optimal motion searching and 1, the current string length is not 0, and an average cost of pixels in the current string is less than an average cost of pixels in the string under the previous optimal motion searching.

It should be understood that, during the searching process, the reference pixel cannot exceed an image boundary and be an encoded pixel. The chrominance components may not participate in the traversing of the motion searching candidate, and the optimal motion searching candidate may be used directly as the motion searching candidate of the chrominance components. If a matching pixel of a current pixel is not found, a pixel value of the current pixel may be encoded directly.

In 227, the obtaining of a reconstructed block. The current block may include a plurality of strings and pixels (also referred to as unmatched pixels) that do not form a string. For each of the plurality of strings, reconstructed values (i.e., prediction values) of the string may be pixel values of a matching string of the string. For each of the pixels that do not form a string, a reconstructed value of the pixel may be an original pixel value of the pixel. Further, a rdcost of the current block and the reconstructed block may be calculated using SSE.

In 229, information may be saved. If the rdcost in the current SP pattern is less than a rdcost in the previous optimal prediction pattern, a matching flag under the current SP pattern, a coordinate difference between each of pixel strings in the current block and the matching string corresponding to the pixel string, a count of pixels in each of matching strings corresponding to the pixel strings, and a type of each matching string may be saved.

(2-3), motion compensation. A reconstructed value under the current SP pattern may be a reference value, so that a transformation and quantization operation may not need to be performed.

(2-4), syntactic element. The syntactic element may refer to an identification used to indicate some parameters configured by an encoding end or an encoding technology and manner used by the encoding end. The syntactic element may need to be encoded at the encoding end, that is, a value of the syntactic element may be converted, using a specific encoding manner, into a string of characters composed of "0" and "1" that may be read by a computer. Further, the syntactic element may be encoded into a code stream and transmitted to a decoding end. The decoding end may obtain the meaning represented by the syntactic element by parsing the encoded characters, so that the decoding end may know information encoded by the encoding end and take corresponding operations. For example, a syntactic element SPCuFlag may represent whether a current CU uses SP technology. SPCuFlag=1 may indicate that SP technology is used. SPCuFlag=0 may indicate that SP technology is not used. A value of the SPCuFlag may need to be encoded into a code stream during encoding and be transmitted to a decoding end. The decoding end may determine whether the encoding end uses SP technology by parsing the value of the SPCuFlag. If SP technology is used, the decoding end may decode the code stream through an operation related to the SP technology.

There may be no pixel residual information in the SP pattern. However, under the SP pattern, a string matching pattern flag (i.e., a syntactic element indicating the string matching pattern), a flag (i.e., a syntactic element) indicating whether a matching string is found, a length of current string, a motion vector (or an index that indicates whether the motion vector is in a historical candidate list) of current string, or information of unmatched pixel may be transmitted to represent all the information needed for the motion searching of the current block.

Figure 3:
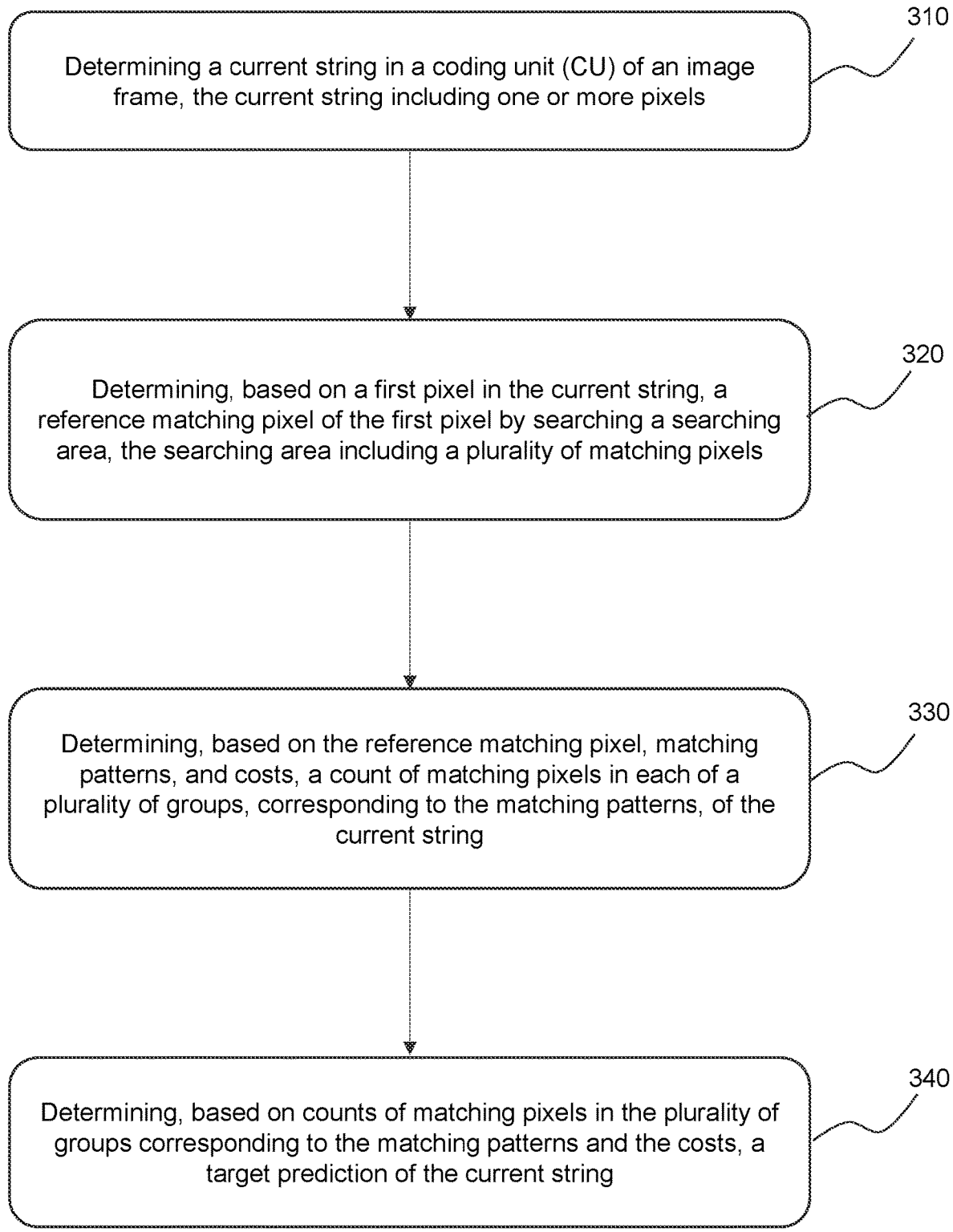
FIG. 3 is a flowchart illustrating an exemplary process for video encoding according to some embodiments of the present disclosure.

FIG. 3 is a flowchart illustrating an exemplary process for video encoding according to some embodiments of the present disclosure. In some embodiments, the process 300 may be implemented by a video encoding system (e.g., a video encoding system 1100 illustrated in FIG. 11). In some embodiments, the video encoding system may be implemented by software and/or hardware, and/or may be integrated into a video encoding device that includes a processing device. In some embodiments, at least part of process 300 may be performed by the processing device including at least one processor and a storage device. For example, the process 300 may be stored in the storage device in the form of instructions (e.g., an application), and invoked and/or executed by the processing device. The operations of the illustrated process presented below are intended to be illustrative. In some embodiments, the process 300 may be accomplished with one or more additional operations not described, and/or without one or more of the operations discussed. Additionally, the order in which the operations of the process 300 as illustrated in FIG. 3 and described below is not intended to be limiting.

In 310, a current string in a coding unit (CU) (also referred to as a current block) of an image frame may be determined. In some embodiments, operation 310 may be performed by a determination module 1110.

In some embodiments, the current block may include a plurality of pixels. The current string may refer to several consecutive pixels in the current block.

In some embodiments, for an image frame to be coded, before encoding, the image frame may be divided into one or more blocks, that is, the image to be coded may be divided into a plurality of coding units. Several consecutive pixels in each coding unit may be grouped into a string, that is the current string.

In some embodiments, the current string may be determined by dividing the current block in any manner. For example, the current string may be determined by dividing the current block based on textures or other attributes of the pixels in the current block. In some embodiments, a dividing manner of the current block may include a horizontal dividing manner, a vertical dividing manner, etc.

In 320, a reference matching pixel of a first pixel in the current string may be determined by searching a searching area based on the first pixel. In some embodiments, operation 320 may be performed by a searching module 1120.

In some embodiments, the first pixel in the current string may refer to a pixel (also referred to as a starting pixel) located at a starting point of the current string. For example, for a current string in a horizontal direction, the first pixel in the current string may be a pixel located at a leftmost side of the current string.

In some embodiments, the searching area may refer to an area for searching a matching string of the current string. In some embodiments, a top side of the searching area may not exceed a top boundary of a current LCU where the current block is located, and a left side of the searching area may not exceed a left boundary of an adjacent LCU located at a left side of the current LCU. In some embodiments, the searching area may include a plurality of matching pixels.

In some embodiments, the reference matching pixel of the first pixel may refer to a matching pixel located at a starting point of a target prediction (also referred to as an optimal matching string) of the current string. The reference matching pixel of the first pixel may also be referred to as a matching pixel of the first pixel (i.e., the starting pixel) in the current string.

In some embodiments, the reference matching pixel of the first pixel may be determined by searching the searching area based on the first pixel. More descriptions regarding the searching manner may be found elsewhere in the present disclosure, for example, FIG. 2C and relevant descriptions thereof.

In 330, a count of matching pixels in each of a plurality of groups, corresponding to matching patterns, of the current string may be determined based on the reference matching pixel, the matching patterns, and costs. In some embodiments, operation 330 may be performed by a matching module 1130.

In some embodiments, a matching pattern may refer to a manner used to search a matching string of the current string.

In some embodiments, the matching patterns may include a horizontal matching pattern, a vertical matching pattern, and/or a diagonal matching pattern each of which may correspond to a preset direction. Specifically, the horizontal matching pattern, the vertical matching pattern, and the diagonal matching pattern may respectively correspond to the horizontal direction, the vertical direction, and the diagonal direction. For the purposes of illustration, the horizontal matching pattern, the vertical matching pattern, and the diagonal matching pattern may be referred to as a multi-directional matching pattern. In some embodiments, after the reference matching pixel of the first pixel is determined, matching strings of the current string may be searched along a plurality of preset directions. Merely by way of example, the plurality of preset directions may include at least one of a horizontal direction same as a scanning direction of the current string, a horizontal direction opposite to the scanning direction of the current string, the vertical direction, and the diagonal direction. After the matching strings of the current string are searched, a matching string with a highest matching degree may be selected from the matching strings as the target prediction of the current string, so as to realize the SP of the current string. It should be understood that the preset directions may not be limited to the above disclosed embodiments. The preset directions may also include other reasonable directions, for example, a direction with an angle of ±30° from the horizontal direction to the right relative to the current ring. In some embodiments, the preset directions may be adjusted according to actual application scenarios. For example, the preset directions may include the horizontal direction and the vertical direction, but not the diagonal direction.

In some embodiments, positions of pixels in a matching string of the current string may be adjusted. Specifically, after a matching string of the current string is searched, for example, according to a horizontal arc scanning manner, the positions of the pixels in the matching string may be adjusted to obtain a new matching string. Further, a matching degree between the current string and each of the matching string and multiple new matching strings obtained by adjusting the matching string may be calculated. By comparing matching degrees, a matching string may be selected from the matching string and the multiple new matching strings as the target prediction of the current string, so as to achieve the SP of the current string.

In some embodiments, the encoding efficiency may be improved by the matching patterns corresponding to the plurality of preset directions and the adjustment of the positions of the pixels in the matching string. In some embodiments, the matching patterns corresponding to the plurality of preset directions and the adjustment of the positions of the pixels in the matching string may be jointly performed. For example, after a matching string corresponding to a specific preset direction is searched, positions of pixels in the matching string may be adjusted to generate multiple new matching strings. Further, a first matching string with a highest matching degree may be selected from the matching strings including the matching string corresponding to the specific preset direction and the multiple new matching strings generated by adjusting the matching string corresponding to the specific preset direction. The operations mentioned above may be repeated until first matching strings corresponding to all the preset directions are obtained, and then an optimal matching string with a highest matching degree may be selected from the first matching strings corresponding to all the preset directions. The optimal matching string with a highest matching degree among the first matching strings corresponding to all the preset directions may be designated as the target prediction of the current string. As another example, a second matching string with a highest matching degree may be selected from matching strings corresponding to all the preset directions. Further, positions of pixels in each of the matching strings corresponding to all the preset directions may be adjusted to generate new matching strings. A third matching string with a highest matching degree may be selected from the new matching strings corresponding to the matching strings corresponding to all the preset directions. By comparing matching degrees, a matching string with a higher matching degree may be selected from the second matching string and the third matching string, and the matching string with a higher matching degree may be selected from the second matching string and the third matching string may be designated as the target prediction of the current string.

In some embodiments, a matching string may need to satisfy a preset condition. The preset condition may include that pixels in the matching string in a preset direction are reconstructed pixels (i.e., encoded pixels), and a corner of the matching string is 90° when a current string corresponding to the matching string crosses at least two pixel rows (that is, the current string is a cross-line string).

In some embodiments, a scanning direction of the current string may include from left to right, from right to left, vertically upward, or vertically downward. Accordingly, a scanning direction of the matching string may also include from left to right, from right to left, vertically upward, or vertically downward.

For example, as shown in FIGS. 4A-4C, a current string with a length of 4 (i.e., including 4 pixels a, b, c, and d) may be predicted, and the current string may be scanned from left to right (i.e., from pixel a to pixel d), arrows between the pixels may indicate that the pixels correspond to each other, for example, pixel a may correspond to pixel a1. As shown in FIG. 4A, a matching string of the current string may be arranged horizontally from right to left, that is, from pixel a1 to pixel d1. As shown in FIG. 4B, the matching string of the current string may be arranged vertically upward, that is, from pixel a2 to pixel d2. As shown in FIG. 4C, the matching string of the current string may be arranged vertically downward, that is, from pixel a3 to pixel d3.

In some embodiments, the current string may be a cross-line string including a first substring and a second substring located at a next pixel row of the first substring. In some embodiments, a scanning direction of the first substring may be from left to right, and a scanning direction of the second substring may be from right to left. In some embodiments, the scanning direction of the first substring may be from right to left, and the scanning direction of the second substring may be from left to right. A matching string of the current string may include a first matching substring and a second matching substring. Scanning directions of the matching string may include that a scanning direction of the first matching substring is from right to left, and a scanning direction of the second matching substring is from left to right; that the scanning direction of the first matching substring is from bottom to top, and the scanning direction of the second matching substring is from top to bottom; that the scanning direction of the first matching substring is from top to bottom, the scanning direction of the second matching substring is from bottom to top, or that the scanning directions of the matching string are the same as the scanning directions of the current string.

Figure 5A:
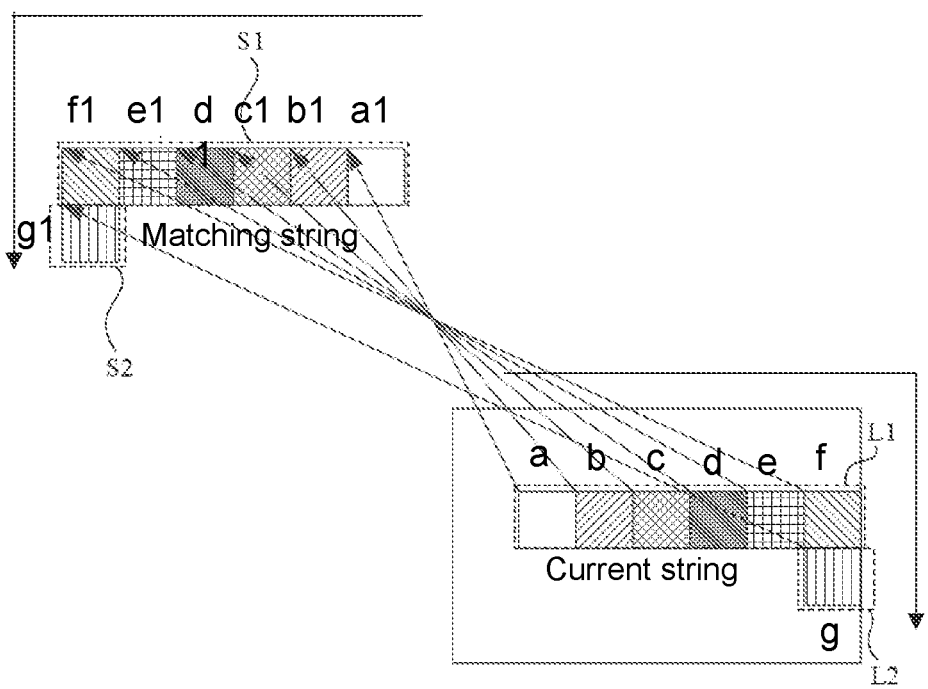
FIG. 5A is a schematic diagram illustrating matching of a current string and a matching string when the matching string is arranged in a reversed order of a scanning manner of the current string according to some embodiments of the present disclosure.
Figure 5B:
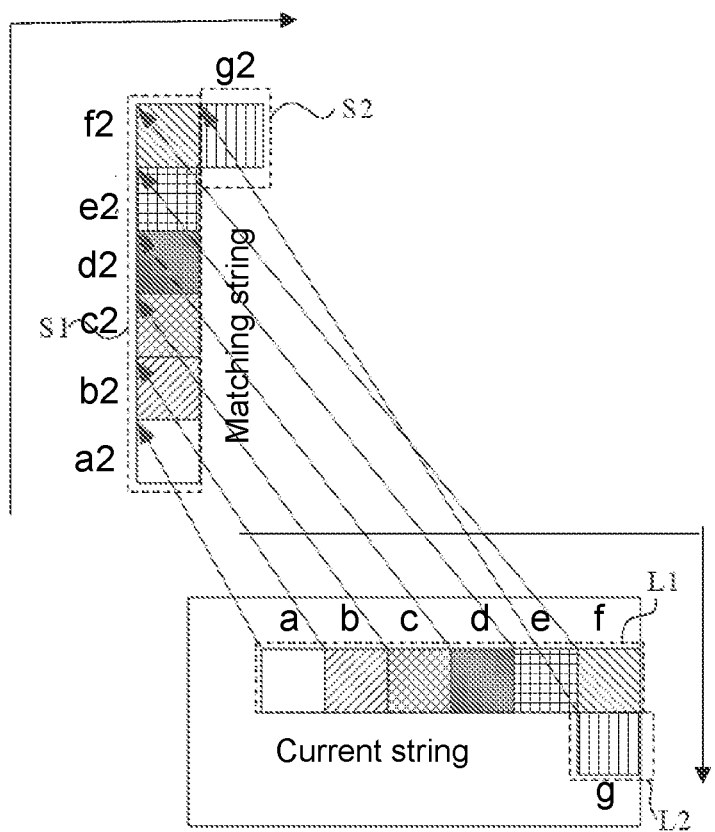
FIG. 5B is a schematic diagram illustrating matching of a current string and a matching string when the matching string is arranged in a reversed order of a scanning manner of the current string according to some embodiments of the present disclosure.
Figure 5C:
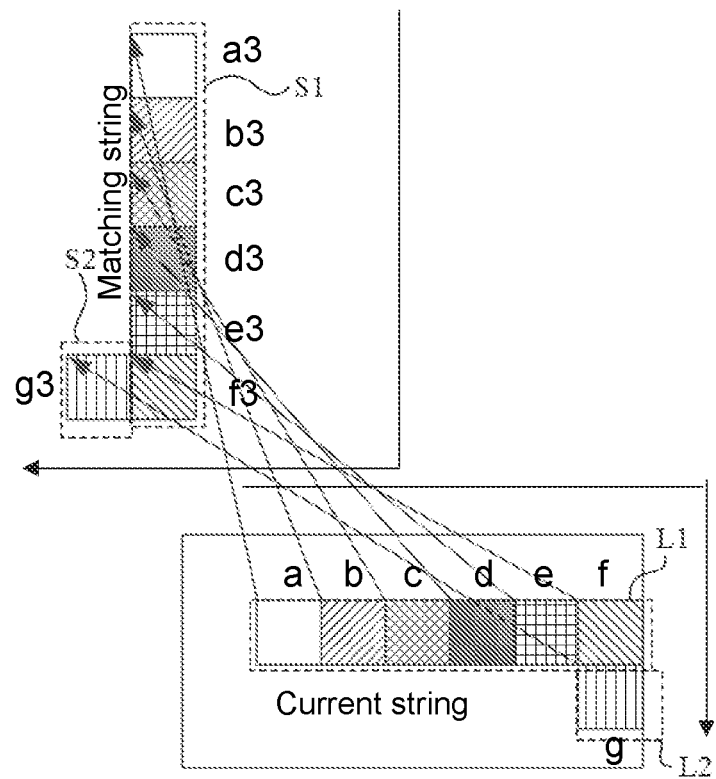
FIG. 5C is a schematic diagram illustrating matching of a current string and a matching string when the matching string is arranged in a vertical direction according to some embodiments of the present disclosure.

For example, as shown in FIGS. 5A-5C, a cross-line string with a length of 7 (i.e., including 7 pixels a, b, c, d, e, f, and g) may be predicted. The current string (i.e., the cross-line string) may include a first substring L1 and a second substring L2 located at a next pixel row of the first substring L1. The first substring L1 of the current string may be scanned from left to right (i.e., from pixel a to pixel f), and the second substring L2 may be scanned from right to left. As shown in FIG. 5A, a matching string of the current string may include a first matching substring S1 and a second matching substring S2. The arrangement (i.e., from pixel a1 to pixel g1) of the matching string of the current string may be opposite to the arrangement (i.e., from pixel a to pixel g) of the current string. In other words, pixel a1 to pixel g1 of the matching string of the current string may be arranged from the right to the left, and pixel a to pixel g of the current string may be arranged from the left to the right. As shown in FIG. 5B, the first matching substring S1 may be arranged vertically upward, that is, from pixel a2 to pixel f2, and the second matching substring S2 may be arranged vertically downward, that is, pixel g2. As shown in FIG. 5C, the first matching substring S1 may be arranged vertically downward, that is, from pixel a3 to pixel f3, and the second matching substring S2 may be arranged vertically upward, that is, pixel g3. It should be understood that a count of pixel rows of the current string may not be limited to one or two, but may also be three or more. The scanning manner of the corresponding matching string may be similar to the above embodiments, which may not be repeated herein.

In some embodiments, a diagonal direction may include a first diagonal direction and a second diagonal direction. The scanning direction of the current string may be from left to right, and the scanning direction of the matching string of the current string may be from bottom to top along the first diagonal direction, from top to bottom along the first diagonal direction, from bottom to top along the second diagonal direction, or from top to bottom along the second diagonal direction.

Figure 6A:
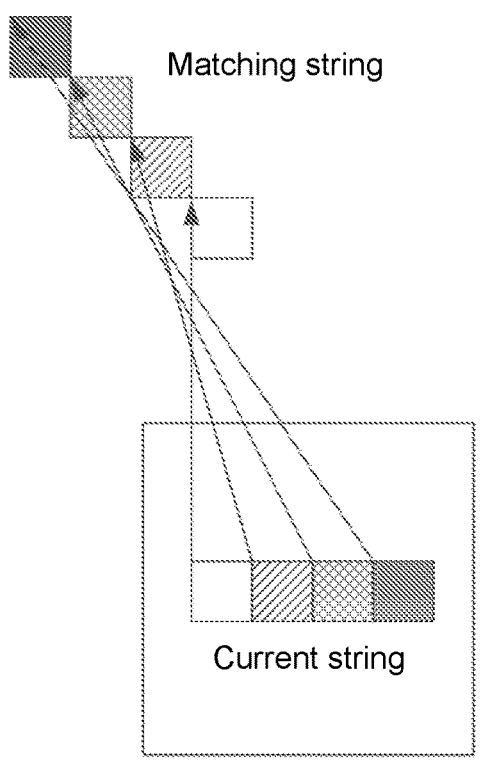
FIG. 6A is a schematic diagram illustrating matching of a current string and a matching string when the matching string is arranged diagonally in an upper left direction according to some embodiments of the present disclosure.
Figure 6B:
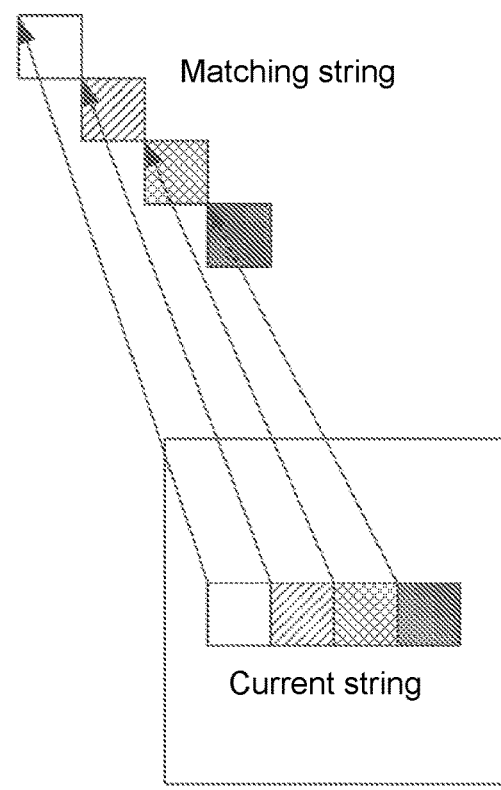
FIG. 6B is a schematic diagram illustrating matching of a current string and a matching string when the matching string is arranged diagonally in a bottom right direction according to some embodiments of the present disclosure.
Figure 6C:
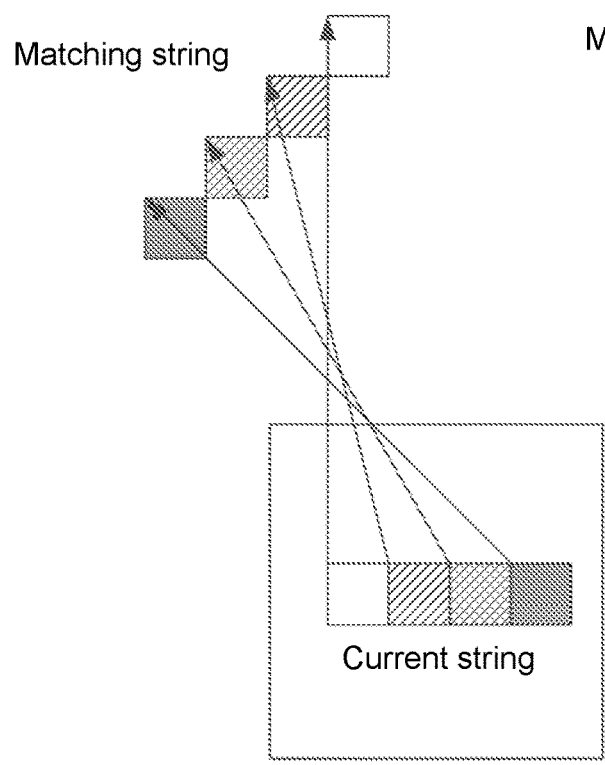
FIG. 6C is a schematic diagram illustrating matching of a current string and a matching string when the matching string is arranged diagonally in a bottom left direction according to some embodiments of the present disclosure.
Figure 6D:
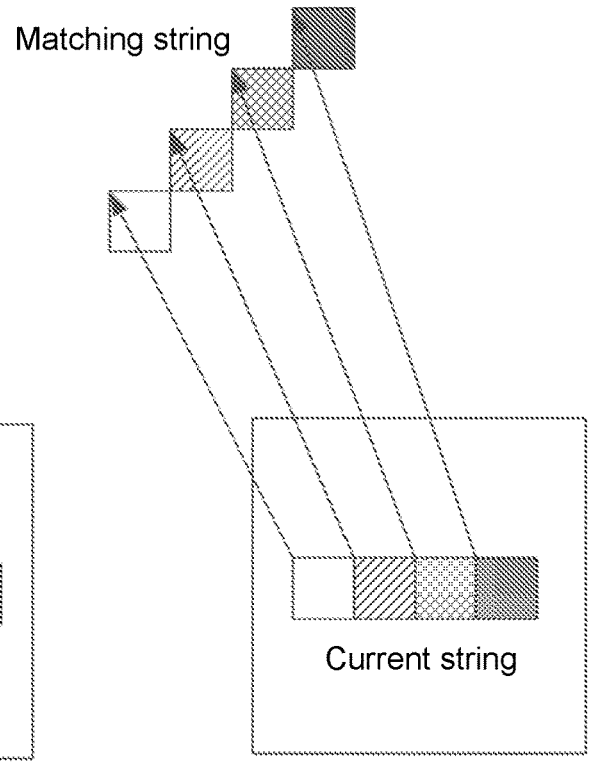
FIG. 6D is a schematic diagram illustrating matching of a current string and a matching string when the matching string is arranged diagonally in an upper right direction according to some embodiments of the present disclosure.
Figure 6E:
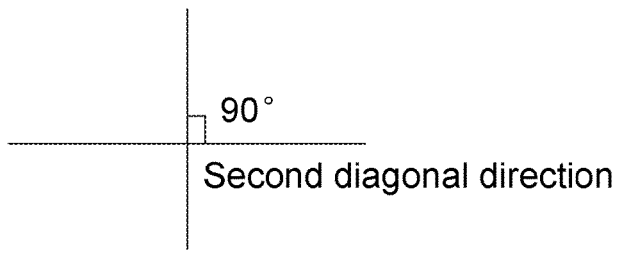
FIGS. 6E-6I are schematic diagrams illustrating a first diagonal direction and a second diagonal direction according to some embodiments of the present disclosure.
Figure 6F:
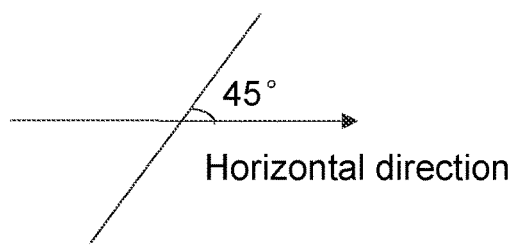
Figure 6G:
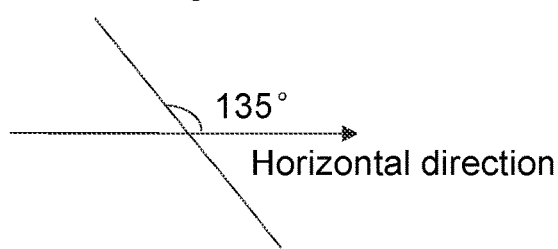
Figure 6H:
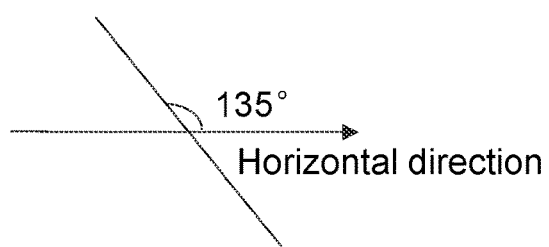
Figure 6I:
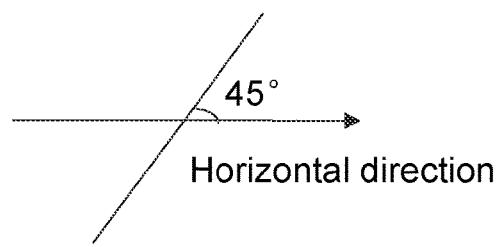

Specifically, as shown in FIG. 6E, the first diagonal direction may be perpendicular to the second diagonal direction. In some embodiments, as shown in FIG. 6F, the first diagonal direction may be a direction with an angle of 45° to a horizontal direction. In some embodiments, as shown in FIG. 6G, the second diagonal direction may be a direction with an angle of 135° to the horizontal direction. In some embodiments, as shown in FIG. 6H, the first diagonal direction may be a direction with an angle of 135° to the horizontal direction. In some embodiments, as shown in FIG. 6I, the second diagonal direction may be a direction with an angle of 45° to the horizontal direction.

For example, as shown in FIGS. 6A-6D, a current string with a length of 4 may be predicted. The current string may be scanned from left to right, and a matching string of the current string may be arranged along a diagonal direction, arrows between the pixels may indicate that the pixels correspond to each other. As shown in FIG. 6A, the matching string of the current string may be arranged diagonally upward along the second diagonal direction as shown in FIG. 6G or the first diagonal direction as shown in FIG. 6H. As shown in FIG. 6B, the matching string of the current string may be arranged diagonally downward along the second diagonal direction shown in FIG. 6G or the first diagonal direction as shown in FIG. 6H. As shown in FIG. 6C, the matching string of the current string may be arranged diagonally downward along the second diagonal direction shown in FIG. 6I or the first diagonal direction as shown in FIG. 6F. As shown in FIG. 6D, the matching string of the current string may be arranged diagonally upward along the second diagonal direction shown in FIG. 6I or the first diagonal direction as shown in FIG. 6F.

In some embodiments, when the matching patterns corresponding to the plurality of preset directions (i.e., at least one of horizontal direction, vertical direction, and diagonal direction) are used to predict a current string, a syntactic element may need to be added to indicate the scanning direction of a matching string of the current string. Specifically, when a value of the syntactic element is a first preset value, the scanning directions of pixels in the matching string and the current string may be the same. When the value of the syntactic element is a second preset value, the scanning direction of the pixels in the matching string may be a horizontal direction opposite to the scanning direction of the pixels in the current string. When the value of the syntactic element is a third preset value, the scanning direction of the pixels in the matching string may be vertically downward. When the value of the syntactic element is a fourth preset value, the scanning direction of the pixels in the matching string may be vertically upward. When the value of the syntactic element is a fifth preset value, the scanning direction of the pixels in the matching string may be from bottom to top along the first diagonal direction. When the value of the syntactic element is a sixth preset value, the scanning direction of the pixels in the matching string may be from top to bottom along the first diagonal direction. When the value of the syntactic element is a seventh preset value, the scanning direction of the pixels in the matching string may be from bottom to top along the second diagonal direction. When the value of the syntactic element is an eighth preset value, the scanning direction of the pixels in the matching string may be from top to bottom along the second diagonal direction. It should be noted that the first preset value, the second preset value, the third preset value, the fourth preset value, the fifth preset value, the sixth preset value, the seventh preset value, and the eighth preset value may be different. For example, a syntactic element ref_dir may be added. Ref_dir being of 0 may indicate that the arrangement of the matching string and the current string is the same; ref_dir being of 1 may indicate that the matching string is arranged in a horizontal direction opposite to the scanning direction of the current string; ref_dir being of 2 may indicate that the matching string is arranged vertically upward; ref_dir being of 3 may indicate that the matching string is arranged vertically downward.

The multi-directional matching pattern and the adjustment of the positions of the pixels in the matching string may be used individually or in combination, so that an optimal matching string that matches the current string better may be found, thereby improving the compression rate, the efficiency, and the performance of the video encoding.

In some embodiments, pixels in a matching string may be flipped according to a flip pattern to generate a new matching string (also referred as to a flipped matching string). Before the target prediction (i.e., an optimal matching string of the current string) of the current string is determined, in order to obtain the optimal matching string of the current string more accurately, during each searching process of the matching string, positions of pixels within a searched matching string may be adjusted, but a predicted traversal order of the pixels in the current string and the matching string of the current string may keep unchanged. For example, the current string includes four consecutive pixels C1-C4 that are arranged from C1 to C4, the matching string of the current string includes four consecutive pixels D1-D4 that are arranged from D1 to D4 (the pixels D1-D4 corresponding to pixels C1-C4, respectively), and a predicted traversal order is from left to right. After the positions of the pixels in the matching string are adjusted, the pixels in the matching string may be arranged from D4 to D1. In this case, the pixel C1 may correspond to the pixel D4, the pixel C2 may correspond to the pixel D3, the pixel C3 may correspond to the pixel D2, the pixel C1 may correspond to the pixel D4, that is, the predicted traversal order still is from left to right.

In some embodiments, the flip pattern may include a symmetric flip pattern. Specifically, at least one pixel in a matching string may be selected as a flip axis. Pixels in the matching string located at a right side of the flip axis may be flipped to a left side of the flip axis, and/or pixels in the matching string located at the left side of the flip axis may be flipped to the right side of the flip axis. That is, the pixels in a pixel row that the flip axis is located may be flipped by 180°. For each pixel row in the matching string, the pixels in the pixel row may be flipped according to a flip axis corresponding to the pixel row, that is, the flip axis of the pixel line is only valid for the pixel row.

Figure 7A:
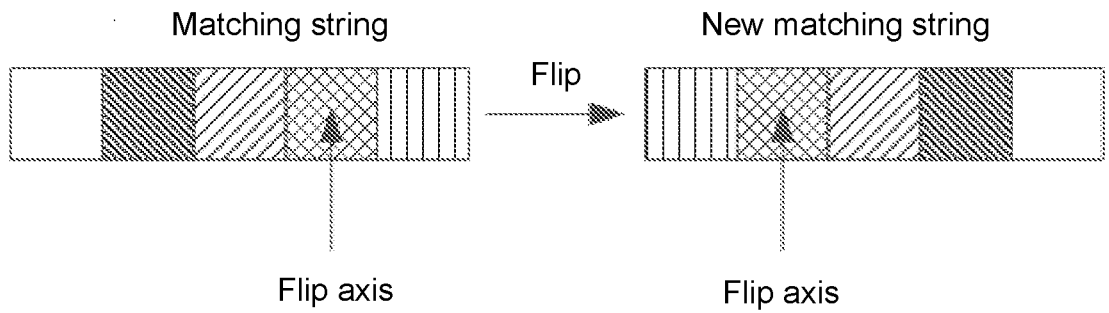
FIG. 7A is a schematic diagram illustrating flipping a matching string according to some embodiments of the present disclosure.
Figure 7B:
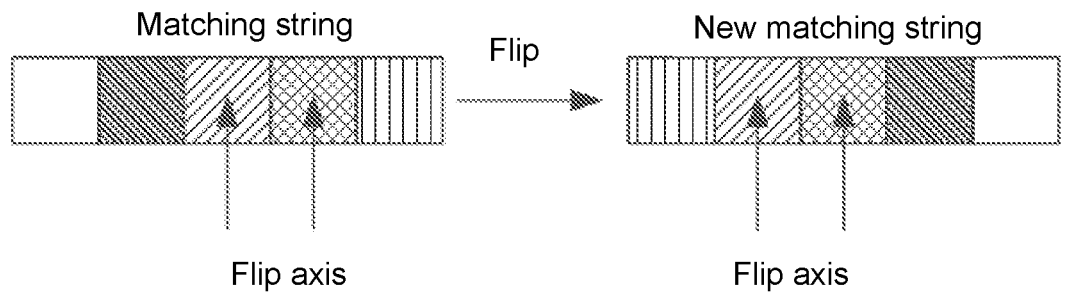
FIG. 7B is a schematic diagram illustrating flipping a matching string according to some embodiments of the present disclosure.
Figure 7C:
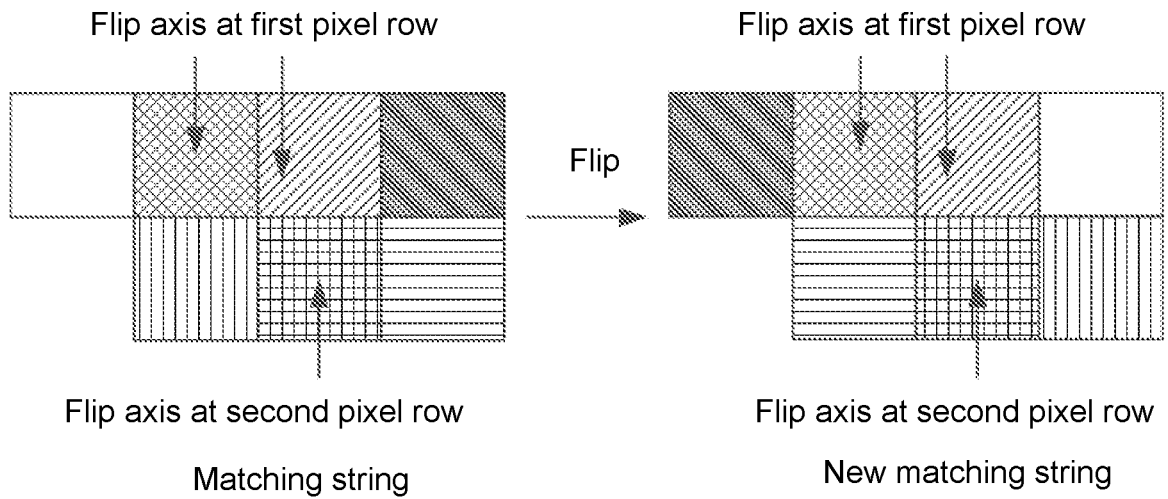
FIG. 7C is a schematic diagram illustrating flipping a matching string according to some embodiments of the present disclosure.

In some embodiments, the flip pattern may include a multi-axis flip pattern. Specifically, when a pixel row has a plurality of continuous flip axes. For example, as shown in FIG. 7A, a length of a matching string is 5. If a flip axis is the second pixel of the matching string from right to left, a new matching string may be obtained after the matching string is flipped according to the flip axis. As shown in FIG. 7B, if flip axes include the second pixel and the third pixel of the matching string from right to left, a new matching string may be obtained after the matching string is flipped according to the flip axes. Specifically, as shown in FIG. 7B, the pixels in the matching string are rotated 180 degrees with the flip axes as the symmetry axis. As another example, as shown in FIG. 7C, a length of a matching string is 7 and the matching string includes two pixel rows. Two pixels in the middle of one of the two pixel rows and one pixel in the middle of the other of the two pixel rows may be selected as flip axes. A new matching string may be obtained after the matching string is flipped according to the flip axes. Specifically, as shown in FIG. 7C, the pixels in the first pixel rows of the matching string are rotated 180 degrees with the flip axes at the first pixel rows as the symmetry axis; the pixels in the second pixel rows of the matching string are rotated 180 degrees with the flip axis in the second pixel rows as the symmetry axis.

Figure 7D:
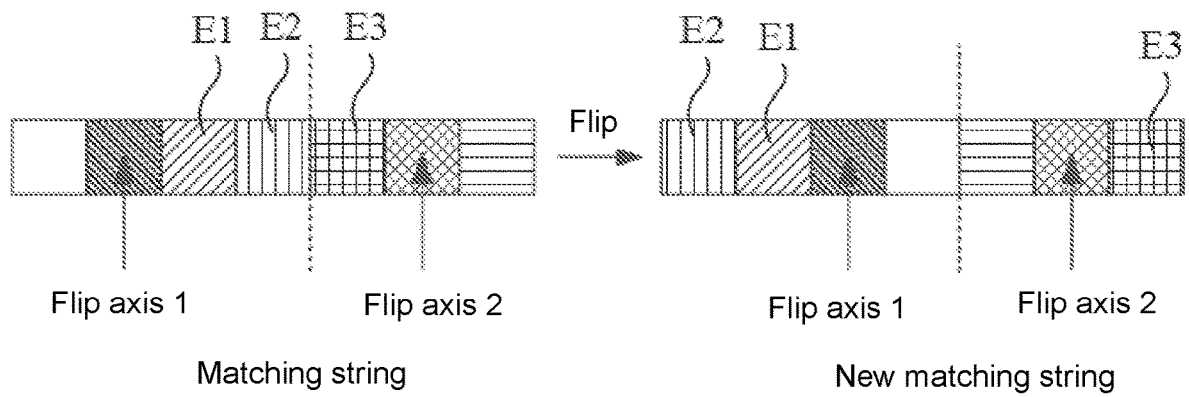
FIG. 7D is a schematic diagram illustrating flipping a matching string according to some embodiments of the present disclosure.

In some embodiments, in the multi-axis flip pattern, a plurality of discontinuous pixels in a matching string in a same pixel row may be selected as flip axes. That is, the flip axes may not be continuous. A part of pixels between two adjacent flip axes may be flipped according to one of the two adjacent flip axes close the part of pixels, the other part of pixels between the two adjacent flip axes may be flipped according to the other of the two adjacent flip axes. For example, as shown in FIG. 7D, a length of a matching string is 7, and there are two non-continuous flip axes 1 and 2. The flip axis 1 is located at the second pixel of the matching string from left to right. The flip axis 2 is located at the second pixel of the matching string from right to left. For three pixels E1-E3 between the two flip axes 1 and 2, the pixels E1 and E2 may be flipped based on the flip axis 1, and the pixel E3 may be flipped based on the flip axis 2, or the pixel E1 may be flipped based on the flip axis 1, and the pixels E2 and E3 may be flipped based on the flip axis 2.

Figure 7E:
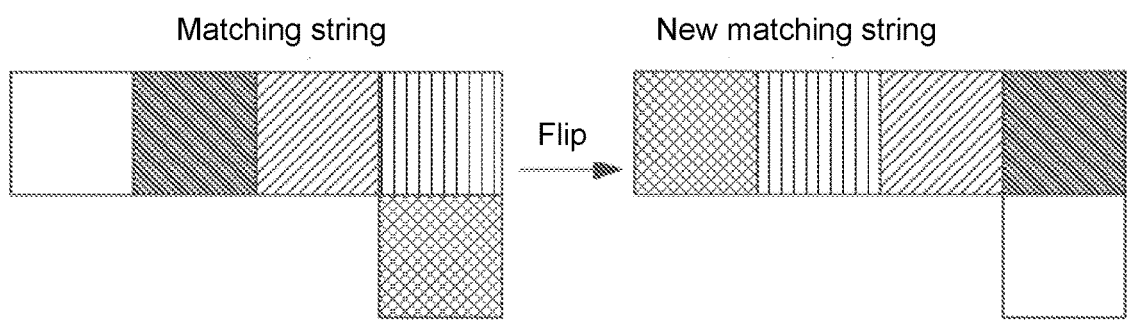
FIG. 7E is a schematic diagram illustrating flipping a matching string according to some embodiments of the present disclosure.

In some embodiments, the flip pattern may further include a complete flip pattern. The complete flip pattern may be performed by changing the i-th ($1 \le i \le m$ is a count of pixels in a matching string) pixel of the matching string into the j-th ($1 \le j \le m$, $i+j=m+1$) pixel of a new matching string of the matching string. That is, an order of the pixels in the matching string may be completely reversed. In this case, a last pixel in the matching string becomes a first pixel in the new matching string, a penultimate pixel in the matching string becomes a second pixel in the new matching string, and a first pixel in the matching string becomes a last pixel in the new matching string. For example, as shown in FIG. 7E, a length of a matching string is 5 and the matching string includes two pixel rows. A new matching string may be obtained after the matching string is flipped according to the complete flip pattern.

In some embodiments, the flip pattern may be designed or adjusted according to specific application requirements, so that the positions of the pixel in a matching string may be adjusted. For example, each pixel in the matching string may be regarded as a flip axis.

In some embodiments, when the flip pattern is adopted, a syntactic element may need to be added to represent whether or which flip pattern is adopted when a matching string of a current string is determined. Specifically, when a value of the syntactic element is a ninth preset value, the matching string may not be flipped. When the value of the syntactic element is a tenth preset value, the matching string may be flipped according to a first flip pattern. When the value of the syntactic element is an eleventh preset value, the matching string may be flipped according to a second flip pattern. When the value of the syntactic element is a twelfth preset value, the matching string may be flipped according to a third flip pattern. It should be noted that the values of the ninth preset value, the tenth preset value, the eleventh preset value, the twelfth preset value, and the twelfth preset value may be different. For example, a syntactic element str_rev may be added. Str_rev being of 0 may indicate that a matching string of a current string is not flipped;str_rev being of 1 may indicate that the matching string of the current string is flipped according to the first flip pattern; str_rev being of 2 may indicate that the matching string of the current string is flipped according to the second flip pattern; str_rev being of 3 may indicate that the matching string of the current string is flipped according to the third flip pattern.

Figure 8:
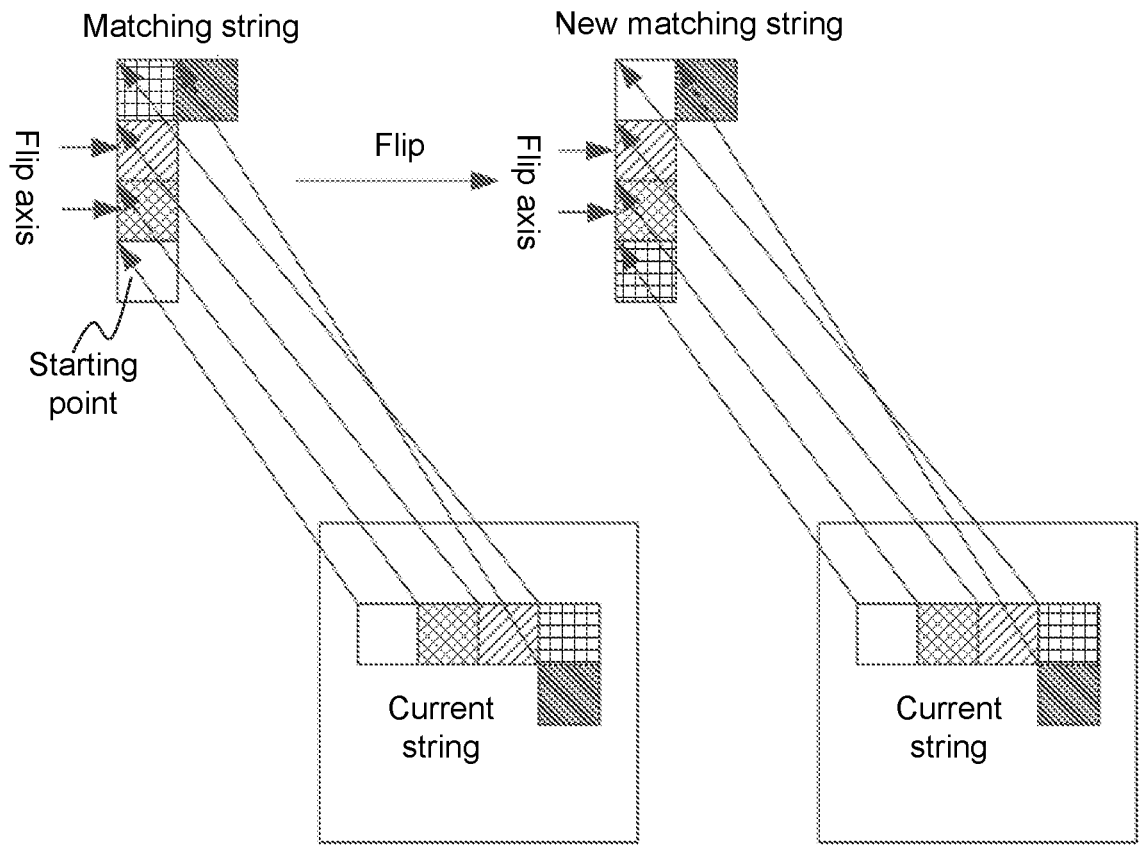
FIG. 8 is a schematic diagram illustrating a matching string arranged and flipped in a vertical direction according to some embodiments of the present disclosure.

In some embodiments, the multi-directional matching pattern and the flip pattern may be combined. For example, as shown in FIG. 8, a length of a current string is 5 and the current string includes two pixel rows. The matching string is arranged from a starting point (e.g., a first pixel) of the matching string to the upward. A second pixel and a third pixel in the matching string are selected as flip axes, respectively. A new matching string may be obtained by flipping the matching string according to the flip axes. A predicted traversal order of pixels in the current string may be unchanged. Since positions of at least a portion of pixels in the matching string have been changed compared to the new matching string, predicted values of pixels in the current string corresponding to the changed pixels in the matching string may be changed. Thus, whether to flip the matching string may be determined by comparing costs of the matching string and the new matching string.

In some embodiments, when the multi-directional matching pattern and the flip pattern are combined, two syntactic elements, for example, ref_dir and str_rev, may need to be added. Ref_dir may represent a scanning direction (i.e., a preset direction used to determine the matching string) of the matching string. Str_rev may represent whether or which flip pattern is adopted when the matching string of the current string is determined. For example, when encoding a current string, a syntactic element ref_dir of 2 is transmitted first, and then a syntactic element str_rev of 3 is transmitted, which may indicate that a matching string of the current string is arranged vertically upwards and the complete flip is adopted when the matching string of the current string is determined.

In some embodiments, a new syntactic element may be added to identify the scheme used in the present disclosure. For example, a syntactic element F1 may be added. F1 being equal to 0 may indicate that an existing scheme is used for prediction. F1 being equal to 1 may indicate that the scheme disclosed in the present disclosure is used for prediction.

In some embodiments, if the scheme disclosed in the present disclosure is adopted, a first syntactic element and/or a second syntactic element may be added. The first syntactic element may be related to an angular direction of a matching string and used to identify a scanning direction of the matching string. The second syntactic element may be related to the adjustment of the matching string and used to identify a flip pattern of the matching string.

By the multi-directional string prediction and the flip pattern (used to adjust the positions of pixels in a matching string), a target prediction that matches the current string better may be determined, thereby improving the accuracy of the prediction and the compression rate of the encoding.

In some embodiments, the cost may refer to a bit cost consumed by a coordinate difference between a current block and a matching block of the current block.

In some embodiments, a cost corresponding to a current string at a CU level (also referred to as a CU-level string or a block-level string for brevity) may be determined by determining a bit cost of a candidate motion vector (SV) of the current string based on an index-based bit cost.

In some embodiments, a CU-level string may refer to a string formed by all pixels in a CU corresponding to the string.

In some embodiments, whether a type of the current string is the CU-level string may be determined. Specifically, whether a type of the current string is the CU-level string may be determined by determining whether a length of the current string is equal to a count of all pixels in a CU corresponding to the current string. If the length of the current string is equal to the count of all pixels in the CU corresponding to the current string, the type of the current string may be the CU-level string. If the length of the current string is not equal to the count of all pixels in the CU corresponding to the current string, the current string may be a string at an ordinary level (also referred to as an ordinary level string for brevity). In some embodiments, during encoding, a syntactic element "IscModelsCuStringFlag" may be arranged to indicate the type of the current string. For example, "IscModelsCuStringFlag=1" may indicate that the current string is a CU-level string; "IscModelsCuStringFlag=0" may indicate that the current string is an ordinary level string. In response to that the current string is the CU-level string, the current string may be encoded through an encoding manner of the CU-level string. In response to that the current string is the ordinary level string, the current string may be encoded through an encoding manner of the ordinary level string.

In some embodiments, the SV of a CU-level string may be selected. If the selected SV of the CU-level string is in a historical candidate motion vector list (In this case, the selected SV is a candidate motion vector), an index of the SV in the historical candidate motion vector list may be used to calculate a bit of the SV of the CU-level string, thereby effectively reducing a count of bits during coding and increasing the compression rate of video coding.

In some embodiments, for an ordinary level string, if the SV of the ordinary level string is in the historical candidate motion vector list, an index of the SV in the historical candidate motion vector list may be used to calculate a bit cost of the SV of the ordinary level string.

Through the embodiments mentioned above, the bit calculation manners of a CU-level string and an ordinary level string may be aligned (e.g., the same), thereby improving the compression rate of video coding. The bit calculation manner mentioned above may be combined with a manner by adding motion vector candidates. In the prior art, the motion information in the historical candidate list may be used to construct the predicted motion vector candidate list, and the effective motion information in the list may be filled into the predicted motion vector candidate list in reverse order. In this case, the historical motion vector candidate list may be a constructed predicted motion vector candidate list. If the SV of the current string is in the predicted motion vector candidate list, an index of the SV in the predicted motion vector candidate list may be used to calculate a bit cost of the SV of the current string, thereby improving the prediction accuracy and the compression rate of SP prediction.

In some embodiments, a cost corresponding to a CU-level string may be determined by weighting a bit cost based on a lamda weighting factor.

The lamda weighting factor may be a coefficient for calculating a bit cost in video compression processing. In some embodiments, the lamda weighting factor may be set by setting a parameter in the encoding calculation. For example, the lamda weighting factor may be set based on a quantization parameter (QP).

A rate-distortion cost (Rdcost) (i.e., the cost) of the CU-level string may be equal to a bit cost plus a distortion (i.e., Rdcost=bit cost+distortion), which may cause the inaccurate of Rdcost. In some embodiments of the present disclosure, the Rdcost may be calculated by weighting the bit cost using the lamda weighting factor, that is, Rdcost=lamda*bit cost+distortion, wherein lamda refers to the lamda weighting factor, thereby improving the accuracy of the Rdcost.

The accuracy of the Rdcost may be improved by introducing the lamda weighting factor.

In some embodiments, a cost corresponding to an ordinary level string may be determined based on a first parameter offset1. The first parameter offset1 may refer to a parameter used to calculate a bit length when information of SV of an ordinary level string is encoded and transmitted.

In some embodiments, when the cost corresponding to the ordinary level string is calculated, during a comparison process for selecting an optimal SV, the first parameter offset1 may be used to calculate the bit length of the optimal SV. The first parameter offset1 may be less than or equal to an absolute value of a horizontal component (i.e., an abscissa) of the SV of the current string and a width of the corresponding current CU, that is, (offset1_x, offset1_y) (|SV_X|, width of the current CU), wherein (offset1_x, offset1_y) refers to the first parameter, SV_X refers to the horizontal component of the SV of the current string.

As mentioned above, when the information of the optimal SV of the ordinary level string is encoded and transmitted, the first parameter offset1 may be used to calculate the bit length. However, in the prediction pattern selection process (e.g., selecting an IBC pattern or an SP pattern), the first parameter offset1 is not used to calculate the bit length of the ordinary level string, which causes, in the comparison process for selecting the optimal SV and the prediction pattern selection process mentioned above, that the calculation manner of the bit length is not aligned and an evaluation criterion is inconsistent, thereby reducing the accuracy of the prediction. In some embodiments of the present disclosure, in both the comparison process for selecting the optimal SV and the prediction pattern selection process, the first parameter may be used to calculate the bit length of the optimal SV, so that the calculation manner of the bit length is aligned, thereby improving the accuracy of the prediction.

It should be noted that the first parameter offset1 may represent a constant that may be obtained at a decoding end and subtracted by the horizontal component (i.e., the abscissa) of the SV. In addition, it is necessary to ensure that a value of the first parameter offset1 minus the horizontal component of the SV is greater than or equal to 0. In some embodiments, if an ordinate of a pixel row where a starting point of the current string is located is an odd number, an initial value of the offset1 may be an abscissa of the starting point of the current string plus 1 (wherein a coordinate of an upper left corner of a CU corresponding to current string is (0,0)). If the ordinate of the pixel row where the starting point of the current string is located is not an odd number, the initial value of the offset1 may be the abscissa of the starting point of the current string plus a string length of the current string. Further, the initial value of the offset1 may be compared with a width of the corresponding CU. If the initial value of the offset1 is greater than the width of the corresponding CU, a value of the first parameter offset1 may be set to the width of the corresponding CU minus 1. If the initial value of the offset1 is not greater than the width of the corresponding CU, the value of the first parameter offset1 may be set to the initial value of offset1 minus 1.

The compression rate of the video coding based on the SP technology may be improved by calculating the bit cost based on the first parameter offset1.

In some embodiments, a count of matching pixels in a group may refer to a count of pixels in a matching string of the current string, that is, a length (e.g., 4) of the matching string.

In some embodiments, several consecutive matching pixels (also referred to as a group) may be determined based on each of the matching patterns, the reference matching pixel, and other pixels in the current string by traversing motion searching candidates. For the matching patterns, the processing device may determine the plurality of groups of matching pixels.

In some embodiments, candidate motion vectors may be obtained. A predicted motion vectors candidate list may be constructed using the candidate motion vectors. An SV of the current string may be determined based on the reference matching pixel and the matching patterns using the predicted motion vectors candidate list. Further, the costs of the SV of the current string may be determined, and the count of matching pixels of the current string may be determined based on the costs, wherein the costs may be related to a difference between pixel values of a pixel (e.g., the first pixel) in the current string and a matching pixel of the pixel. Further, for each of the several consecutive matching pixels in a group, a cost between pixel values of the matching pixel and a pixel corresponding to the matching pixel in the current string may be determined and compared with a preset threshold. If the cost corresponding to the several consecutive matching pixels is less than the preset threshold, a count (e.g., 10) of several consecutive matching pixels may be the count of matching pixels in the group. The candidate motion vectors may include a block vector (BV) in an adjacent domain, a BV in a non-adjacent spatial domain, a BV during an encoding process, an SV in the adjacent domain, an SV in the non-adjacent spatial domain, an SV during the encoding process, and/or a preset SV. The BV and SV may be obtained based on the IBC pattern. Specifically, candidate motion vectors may be obtained first. The candidate motion vectors may include an intra-frame motion vector (e.g., BV or SV) of a block in the adjacent spatial domain of the current block, an intra-frame motion vector (e.g., BV or SV) in a final historical candidate list, an intra-frame motion vector (e.g., BV or SV) in temporary historical candidate lists, an intra-frame motion vector (e.g., BV or SV) of a block in the non-adjacent spatial domain of the current block, a preset fixed intra-frame motion vector (e.g., BV or SV), and/or intra-frame motion vectors obtained by other derivation manners.

In some embodiments, the candidate motion vectors may be used to construct a predicted motion vector candidate list, and the predicted motion vector candidate list may be used to determine the count of matching pixels.

In the process of selecting the SV of the current string, more candidate motion vectors may be added at the encoding end by diversifying the ways of obtaining candidate motion vectors, so that a more accurate SV of the current string may be obtained more easily, thereby improving the accuracy of the SP prediction.

Further, the predicted motion vector candidate list may be constructed by full or partial duplicate checking the obtained candidate motion vectors. The partial duplicate checking may be performed by duplicate checking the candidate motion vectors to be added to the predicted motion vector candidate list with predicted motion vectors at predetermined positions in the predicted motion vector candidate list, which may reduce the operation and time consuming of the duplicate checking, at the same time reduce the duplication rate to a certain extent, and improve the compression rate of the SP technology as a whole. The predetermined positions may be adjusted according to the obtaining manner of the predicted motion vectors.

In some embodiments, the candidate motion vectors may include a p_list, a b_list, and a n_list.

Figure 9:
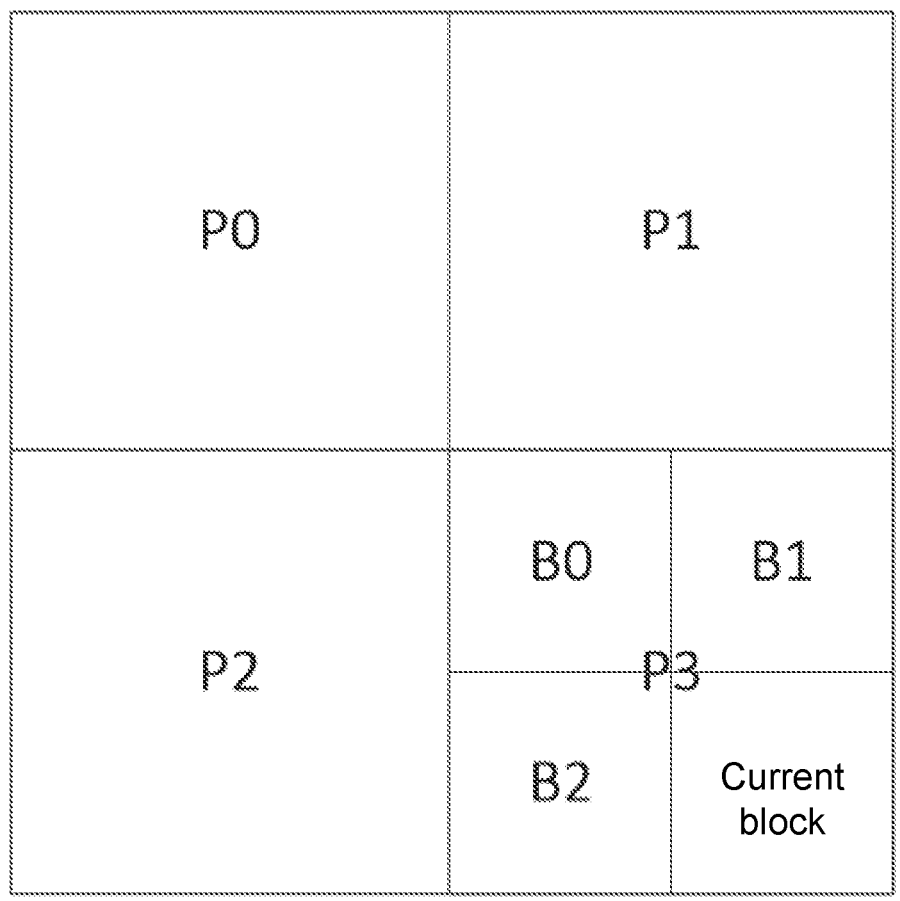
FIG. 9 is a schematic diagram illustrating a dividing manner when a largest coding unit (LCU) is divided into a CU according to some embodiments of the present disclosure.

The n_list may refer to a final historical candidate list under a best division manner of an LCU corresponding to the current string, that is, an HBVP list. The p_list and the b_list may refer to temporary historical candidate lists under other division manners of the LCU corresponding to the current string, that is, a temporary HBVP list. The b_list may store BV or SV of a coded CU under the same division depth. The p_list may store BV or SV of a coded CU under a previous division depth of the division depth corresponding to the b_list. For example, as shown in FIG. 9, B0, B1, B2, and the current block may be at the same division depth. P0, P1, P2, and P3 may be at a previous division depth of the division depth corresponding to the current block. At present, prediction is being performed under a certain division manner of the P3. The b_list may store BVs or SVs of B0, B1, and B2. The p_list may store BVs or SVs of P0, P1, and P2.

Generally, when a CU-level string is predicted, only the motion vectors in the final historical candidate list n_list may be used as the candidate motion vectors. In some embodiments of the present disclosure, when the CU-level string is predicted, both the motion vectors in the final historical candidate list n_list and the motion vectors in the temporary historical candidate lists p_list and b_list may be used as the candidate motion vectors.

Generally, when an ordinary level string is predicted, only the motion vectors in the temporary historical candidate lists p_list and b_list may be used as the candidate motion vectors. In some embodiments of the present disclosure, when the ordinary level string is predicted, both the motion vectors in the final historical candidate list n_list and the motion vectors in the temporary historical candidate lists p_list and b_list may be used as the candidate motion vectors.

Both the motion vectors in the final historical candidate list n_list and the motion vectors in the temporary historical candidate lists p_list and b_list are used as the candidate motion vectors, which may improve the prediction accuracy and the compression rate of the SP prediction.

In 340, a target prediction of the current string may be determined based on the counts of matching pixels in the plurality of groups corresponding to the matching patterns and the costs. More descriptions regarding the matching patterns may be found elsewhere in the present disclosure. See, e.g., operation 330, FIGS. 4-8, and relevant descriptions thereof. In some embodiments, operation 340 may be performed by a predicting module 1140.

In some embodiments, according to each of the matching patterns, a matching string corresponding to a count of matching pixels in a group may be obtained. Accordingly, according to the matching patterns, a plurality of matching strings may be obtained. A matching string may be selected from the plurality of matching strings as the target prediction (i.e., an optimal matching string) of the current string.

In some embodiments, the costs between the matching strings and the current string may be calculated, and a matching string with a smallest cost among the plurality of matching strings may be used as the target prediction of the current string. In some embodiments, after the matching strings corresponding to the counts of matching pixels in the plurality of groups are searched, matching degrees between the matching strings and the current string may be calculated, and a matching string with a highest matching degree among the plurality of matching strings may be used as the target prediction of the current string. For example, the costs between the matching strings and the current string may be calculated, and the matching string with the smallest cost may be determined as the matching string with the highest matching degree. The smaller the cost, the higher the matching degree. Since the target prediction (i.e., the optimal matching string) of the current string has been coded, the current string may be predicted by directly using coding data of the target prediction of the current string.

In some embodiments, the current string may be encoded based on the target prediction of the current string.

In some embodiments, when a CU-level string (i.e., the current string) is encoded, if a vertical component (SV_Y) (i.e., an ordinate) of an SV of the current string is equal to 0, a difference between an absolute value of a horizontal component (SV_X) (i.e., an abscissa) of the SV of the current string and a second parameter offset2 may be designated as an encoding value of the current string. In some embodiments, when the CU-level string (i.e., the current string) is encoded, if the horizontal component of the SV of the current string is equal to 0, a difference between an absolute value of the vertical component of the SV of the current string and a width of the current string may be designated as the encoding value of the current string.

In some embodiments, when the CU-level string (i.e., the current string) is encoded, the horizontal component and the vertical component of the SV of the current string may be obtained. Whether the vertical component of the SV of the current string is less than 1 and the horizontal component of the SV of the current string is equal to 0 may be determined. In response to that the vertical component of the SV of the current string is less than 1 and the horizontal component of the SV of the current string is equal to 0, a value of the vertical component of the SV of the current string may be increased by 1. Further, whether the increased vertical component of the SV of the current string is non-zero may be determined. In response to that the vertical component of the SV of the current string is not less than 1 and/or the horizontal component of the SV of the current string is not equal to 0, whether the vertical component of the SV of the current string is non-zero may be determined. Before the above determination, a syntactic element flag may be encoded to indicate whether the vertical component of the SV of the current string is non-zero.

In some embodiments, if the vertical component of the SV of the current string is 0, the difference between the absolute value of the horizontal component of the SV of the current string and the second parameter offset2 may be encoded. In some embodiments, if a length of the current string is less than a width of the current CU corresponding to the current string, the second parameter offset2 may be the length of the current string. If the length of the current string is greater than or equal to the width of the current CU corresponding to the current string, the second parameter offset2 may be the first parameter offset1 plus 1, and the first parameter offset1 is less than or equal to the absolute value of the horizontal component of the SV of the current string and the width of the current CU.

Generally, if the vertical component of the SV of a CU-level string is 0, a difference between the absolute value of the horizontal component of the SV of the CU-level string and a value 1 may need to be encoded. In this case, a value that needs to be encoded is greater than a value that needs to be encoded in the above embodiments of the present disclosure. Moreover, generally, whether an ordinate of the starting position of the current string is an odd number may need to further be determined. In response to that the ordinate of the starting position of the current string is an odd number, the positive and negative of the horizontal component of the SV of the current string may also need to be encoded. That is, a FLAG may be encoded to indicate whether the horizontal component of the SV of the current string is greater than 0. If the horizontal component of the SV of the current string is greater than 0, the horizontal component of the SV of the current string is positive. If the horizontal component of the SV of the current string is less than 0, the horizontal component of the SV of the current string is negative. In contrast, the encoding manner in the above embodiments of the present disclosure may reduce a count of bits during coding and increase the compression rate of video coding.

It should be noted that the second parameter offset2 may be a constant that may be obtained at a decoding end and used to calculate a bit length. In some embodiments, if a string length of a current string is less than a width of a CU corresponding to the current string, a value of offset2 may be equal to the string length of the current string; if the string length of the current string is not less than the width of the CU corresponding to the current string, the value of offset2 may be equal to the first parameter offset1 plus 1. In some embodiments, the value of offset2 may be further expanded, but it must be available to the decoding end, thereby reducing the count of bits during coding and increasing the compression rate of video coding.

In some embodiments, if the vertical component (i.e., SV_Y) of the SV of the current string is non-zero, whether the vertical component of the SV of the current string is greater than 0 may be determined. In some embodiments, whether the vertical component of the SV of the current string is greater than 0 may be determined by encoding a syntactic element that indicates whether the vertical component of the SV of the current string is greater than 0.

In some embodiments, if the vertical component of the SV of the current string is greater than 0, the vertical component of the SV of the current string is positive, the difference (i.e., |SV_Y|−1) between the absolute value of the vertical component of the SV of the current string and 1, and a difference (i.e., |SV_X|−offset1−1) between the absolute value of the horizontal component (i.e., |SV_X|) of the SV of the current string and the first parameter plus 1 may be encoded.

It should be noted that the encoding of the vertical component of the SV of the current string is positive may include encoding a syntactic element. A value of the syntactic element may indicate whether the vertical component of the SV of the current string is greater than 0.

In some embodiments, if the vertical component of the SV of the current string is less than 0, whether the horizontal component (i.e., SV_X) of the SV of the current string is non-zero may be determined. In some embodiments, whether the horizontal component (i.e., |SV_X|) of the SV of the current string is non-zero may be determined by encoding a syntactic element that indicates whether the horizontal component (i.e., |SV_X|) of the SV of the current string is non-zero.

In some embodiments, if the horizontal component (i.e., SV_X) of the SV of the current string is 0, the vertical component (i.e., SV_Y) of the SV of the current string is negative, SV_X is 0, and a difference (i.e., |SV_Y|−(height−1)) between the absolute value of SV_Y and the width of the current CU corresponding to the current string plus 1 may be encoded. The encoding manner in the above embodiments of the present disclosure may reduce the count of bits during coding and increase the compression rate of video coding. It should be noted that the encoding of SV_Y being negative and SV_X being of 0 may include encoding two syntactic elements that respectively indicate whether SV_Y is greater than 0 and whether SV_X is 0.

In some embodiments, if SV_X is non-zero, whether SV_X is greater than 0 may be determined. In some embodiments, whether SV_X is greater than 0 may be determined by encoding a syntactic element that indicates whether SV_X is greater than 0.

In some embodiments, if SV_X is greater than 0, SV_Y is negative, SV_X is positive, a difference (i.e., |SV_Y|− height) between the absolute value of SV_Y and the width of the current CU corresponding to the current string, and a value (i.e., |SV_X|−1) of the absolute value of SV_X minus 1 may be encoded. It should be noted that the encoding of SV_Y being negative and SV_X being positive may include encoding two syntactic elements that respectively indicate whether SV_Y is greater than 0 and whether SV_X is greater than 0. The values of the two syntactic elements may respectively indicate that SV_Y is negative and SV_X is positive.

In some embodiments, if SV_X is less than 0, SV_Y is negative, SV_X is negative, a value (i.e., |SV_Y|−1) of the absolute value of SV_Y minus 1, and the value (i.e., |SV_X|−1) of the absolute value of SV_X minus 1 may be encoded. It should be noted that the encoding of SV_Y being negative, SV_X being negative may include encoding two syntactic elements that respectively indicate whether SV_Y is greater than 0 and whether SV_X is greater than 0. The values of the two syntactic elements may respectively indicate that SV_Y is negative and SV_X is negative.

In some embodiments, if the current string is a cross-line string that includes at least two pixel rows, that is, ordinates of the pixels in the current string may have two or more different values, a syntactic element corresponding to a unit basis vector may not need to be encoded and transmitted.

The embodiments mentioned above optimize the encoding of SV of the CU-level string, which improves the encoding manner of the SV, thereby reducing the count of bits during coding and increasing the compression rate of the SP prediction without changing the distortion.

In some embodiments, when an ordinary level string is encoded, if SV_Y is equal to 0, a difference (i.e., |SV_X|− offset2) between an absolute value of SV_X and the second parameter offset2 or a difference (i.e., |SV_X|−1) between the absolute value of SV_X and a value 1 may be used as an encoding value of the ordinary level string.

In some embodiments, when the ordinary level string is encoded, the SV_X and the SV_Y may be obtained, and whether the SV_Y is less than 1 and the SV_X is equal to 0 may be determined. In response to that the SV_Y is less than 1 and the SV_X is equal to 0, the SV_Y may be increased by 1 1. In response to that the SV_Y is not less than 1 and the SV_X is not equal to 0, whether the SV_Y is non-zero may be determined. Before the above determination, a syntactic element flag may be encoded to indicate whether SV_Y is non-zero.

In some embodiments, if the SV_Y is 0, whether an index of a pixel row where a starting position of a current string (i.e., the ordinary level string) is located is an odd number may be determined.

In some embodiments, if the index of the pixel row where the starting position of the current string is located is not an odd number and the SV_Y is 0, the difference (i.e., |SV_X|− offset2) between the absolute value of SV_X and the second parameter offset2 may be encoded.

If a length of the current string (i.e., the ordinary level string) is less than a width of the current CU corresponding to the current string, the second parameter offset2 may be the length of the current string. If the length of the current string is greater than or equal to the width of the current CU, the second parameter offset2 may be the first parameter offset1 plus 1. The first parameter offset1 may be less than or equal to the absolute value of the SV_X and the width of the current CU.

Generally, if the SV_Y of an ordinary level string is 0, the difference (i.e., |SV_X|−1) between the absolute value of SV_X and the value 1 may need to be encoded. In this case, a value that needs to be encoded is greater than a value that needs to be encoded in the above embodiments of the present disclosure. Moreover, generally, whether an ordinate of the starting position of the current string (i.e., the ordinary level string) is an odd number may need to further be determined. In response to that the ordinate of the starting position of the current string is an odd number, the positive and negative of the SV_X may also need to be encoded. That is, a FLAG may be encoded to indicate whether the SV_X is greater than 0. In contrast, the encoding manner in the above embodiments of the present disclosure may reduce a count of bits during coding and increase the compression rate of video coding.

In some embodiments, if the index of the pixel row where the starting position of the current string (i.e., the ordinary level string) is located is an odd number, the SV_Y is 0, and the SV_X is positive, the difference (i.e., |SV_X|−1)

between the absolute value of SV_X and the value 1 may be encoded. It should be noted that the encoding of the SV_X being positive may include encoding a syntactic element. A value of the syntactic element may indicate whether the SV_X is greater than 0.

In some embodiments, if the SV_Y is non-zero, whether the SV_Y is greater than 0 may be determined. In some embodiments, whether the SV_Y is non-zero may be determined by encoding a syntactic element that indicates whether the SV_Y is non-zero.

In some embodiments, if the SV_Y is greater than 0 and the SV_Y is positive, a difference (i.e., |SV_Y|−1) between the absolute value of the SV_Y and value 1, and a difference (i.e., |SV_X|−offset1−1) between the absolute value of the SV_X and the first parameter plus 1 may be encoded. It should be noted that the encoding of the SV_Y being positive may include encoding a syntactic element. A value of the syntactic element may indicate whether the SV_Y is greater than 0.

In some embodiments, if the SV_Y is less than 0, whether the SV_X is non-zero may be determined. In some embodiments, whether SV_X is non-zero may be determined by encoding a syntactic element that indicates whether SV_X is non-zero.

In some embodiments, if the SV_X is non-zero and the SV_Y is positive, the positive and negative of SV_X, the difference (i.e., |SV_Y|−1) between the absolute value of the SV_Y and a value 1, and a difference (i.e., |SV_X|−1) between the absolute value of the SV_X and a value 1 may be encoded. It should be noted that the encoding of the SV_Y being positive may include encoding a syntactic element. A value of the syntactic element may indicate whether the SV_Y is greater than 0. The encoding of the positive and negative of the SV_X may include encoding a syntactic element. A value of the syntactic element may indicate whether the SV_X is greater than 0.

The embodiments mentioned above optimize the encoding of SV of the ordinary level string, which improves the encoding manner of the SV, thereby reducing the count of bits during coding and increasing the compression rate of the SP prediction without changing the distortion.

Figure 10A:
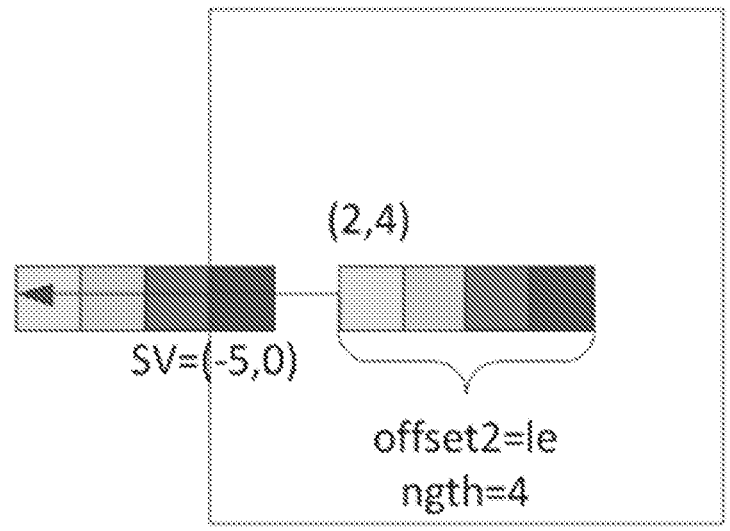
FIG. 10A is a schematic diagram illustrating an encoding manner according to some embodiments of the present disclosure.

In some embodiments, as shown in FIG. 10A, a string in a CU with a size of 8×8 is shown. An ordinate of a pixel row where the string is located is 4, which is an even-numbered row. Coordinates of a starting pixel are (2,4). A string length of the string is 4. An SV of the string is (−5, 0). According to the embodiments mentioned above, a value of a second parameter offset2 may be equal to the string length (i.e., 4).

Figure 10B:
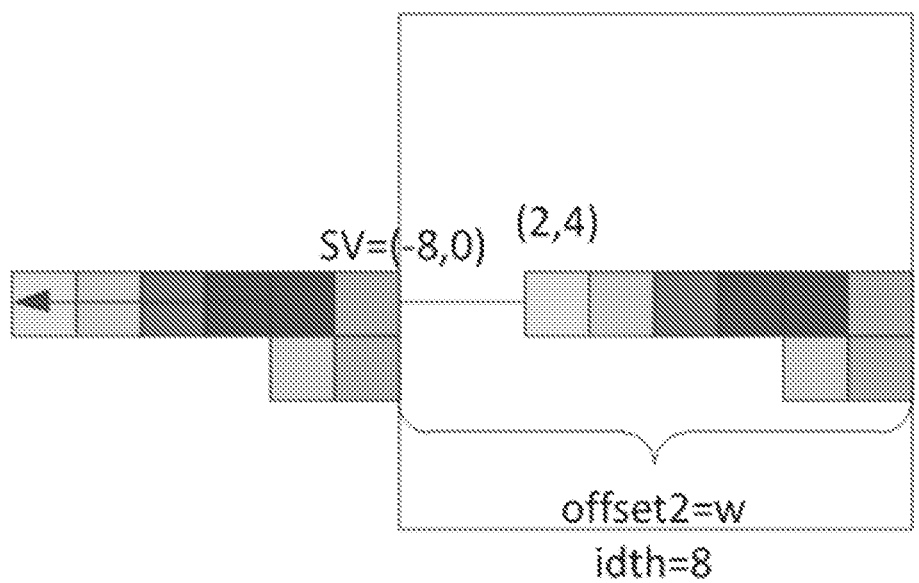
FIG. 10B is a schematic diagram illustrating an encoding manner according to some embodiments of the present disclosure.

In some embodiments, as shown in FIG. 10B, a string in a CU with a size of 8×8 is shown. An ordinate of a pixel row where the string is located is 4, which is an even-numbered row. Coordinates of a starting pixel are (2,4). A string length of the string is 8. An SV of the string is (−8, 0). According to the embodiments mentioned above, a value of a second parameter offset2 may be equal to the string length (i.e., 8).

In some embodiments, according to Audio Video coding Standard 3 (AVS3), exemplary syntactic elements of the present disclosure may be as shown in Table 1.

TABLE 1

| String copy intra prediction definition | Descriptor |
|---|---|
| cu_sp_coding( ) { | |
|   NumCodedPixel = 0 | |
|   NumTotalPixel = width * height | |
|   i = 0 | |
|   while (NumCodedPixel < Num TotalPixel) { | |
|     StrXInCu = TravScan[Log(width) − 2][Log(height) − 2][NumCodedPixel][0] | |
|     StrYInCu = TravScan[Log(width) − 2][Log(height) − 2][NumCodedPixel][1] | |
|     IscMatchTypeFlag[i] = 1 | |
|       isc_match_type_flag[i] | ae(v) |
|     if(IscMatchTypeFlag[i] == 1) { | |
|       next_remaining_pixel_in_cu[i] | ae(v) |
|       next_remaining_pixel_in_cu[i] = next_remaining_pixel_in_cu[i] * 4 | |
|       StrLen[i] = NumTotalPixel − NumCodedPixel − NextRemainingPixelInCu[i] | |
|       sv_above_flag[i]=1 | |
|       IscModeIsCuStringFlag= StrLen[i]== NumTotalPixel?1:0 | |
|       if(IscModeIsCuStringFlag== 0){ | |
|         sv_above_flag[i] | ae(v) |
|       } | |
|       if(!SvAboveFlag) { | |
|         sv_recent_flag[i] | ae(v) |
|         if(SvRecentFlag) { | |
|           sv_recent_idx[i] | |
|         } else { | |
|           IsOddRow = StrYInCu & 0x1 | |
|           SvOffset = StrXInCu | |
|           if (IsOddRow) { | |
|             SvOffset += 1 | |
|           } | |
|           else { | |
|             SvOffset += StrLen[i] | |
|           } | |
|           SvOffset = min(width, SvOffset) | |
|           SvOffset −− | |
|           if(StrLen[i]< width){ | |
|             SvOffset_mvy0= StrLen[i] | |
|           }else{ | |
|             SvOffset_mvy0= SvOffset+1 | |
|           } | |
|           sv_y_non_zero_flag[i] | ae(v) |
|           if(!SvYNonZeroFlag[i]){ | |
|             if(IsOddRow) { | |
|               sv_x_sign[i] | ae(v) |
|             } | |
|             sv_x_abs_minus1[i] | ae(v) |
|             if(!IsOddRow) | |
|               SvXAbsMinus1[i] += SvOffset_mvy0−1 | |
|           } | |
|           else { | |
|             sv_y_sign[i] | ae(v) |
|             if(!IscModeIsCuStringFlag){ | |
|               sv_y_abs_minus1[i] | ae(v) |
|             } | |
|             if(!SvYSign[i]){ | |
|               if(IscModeIsCuStringFlag){ | |
|                 sv_y_abs_minus1[i] | ae(v) |
|               } | |
|               sv_x_abs_minus1[i] | ae(v) |
|               SvXAbsMinus1[i] += SvOffset | |
|             } | |
|             else { | |
|               sv_x_non_zero_flag[i] | ae(v) |
|               if (SvXNonZeroFlag[i]){ | |
|                 sv_x_sign[i] | ae(v) |
|                 if(IscModeIsCuStringFlag){ | |
|                   if(!SvXSign[i]){ | |
|                     sv_y_abs_minus1[i] | ae(v) |
|                     SvYAbsMinus1[i] += height−1 | |
|                   }else{ | |

TABLE 1-continued

| String copy intra prediction definition | Descriptor |
|---|---|
|                 sv_y_abs_minus1[i] | ae(v) |
|               } | |
|             } | |
|             sv_x_abs_minus1[i] | ae(v) |
|             } | |
|             else{ | |
|               if(IscModeIsCuStringFlag){ | |
|                 sv_y_abs_minus1[i] | ae(v) |
|                 SvYAbsMinus1[i] += height−2 | |
|               } | |
|             } | |
|           } | |
|         } | |
|         NumCodedPixel += StrLen[i] | |
|     } | |
|     else{ | |
|         MatchCnt = 0 | |
|         for(j=0; j<4; j++){ | |
|             match_dict[j] | ae(v) |
|             MatchCnt += MatchDict[j] | |
|             if(MatchDict[j] == 0){ | |
|                 isc_unmatched_pixel_y[i] | u(10) |
|               if (component == 'COMPONENT_LUMACHROMA' && !(StrXInCu & 0x1 \|\| StrYInCu & 0x1)) { | |
|                 isc_unmatched_pixel_u[i] | u(10) |
|                 isc_unmatched_pixel_v[i] | u(10) |
|               } | |
|             } | |
|         NumCodedPixel += 1 | |
|         } | |
|         if(MatchCnt > 0){ | |
|             sv_recent_flag[i] | ae(v) |
|             if(SvRecentFlag) { | |
|               sv_recent_idx[i] | |
|             } else { | |
|             IsOddRow = StrYInCu & 0x1 | |
|             SvOffset = StrXInCu | |
|             if (IsOddRow) { | |
|               SvOffset += 1 | |
|             } | |
|             else { | |
|               SvOffset += StrLen[i] | |
|             } | |
|             SvOffset = min(width, SvOffset) | |
|             SvOffset −− | |
|             if(StrLen[i]< width){ | |
|               SvOffset_mvy0= StrLen[i] | |
|             }else{ | |
|               SvOffset_mvy0= SvOffset+1 | |
|             } | |
|             sv_y_non_zero_flag[i] | ae(v) |
|             if(!SvYNonZeroFlag[i]){ | |
|               if(IsOddRow) { | |
|                 sv_x_sign[i] | ae(v) |
|               } | |
|               sv_x_abs_minus1[i] | ae(v) |
|               if(!IsOddRow){ | |
|                 SvXAbsMinus1[i] += SvOffset_mvy0−1 | |
|               } | |
|             } | |
|             else { | |
|               sv_y_sign[i] | ae(v) |
|               if(!IscModeIsCuStringFlag){ | |
|                 sv_y_abs_minus1[i] | ae(v) |
|               } | |
|               if(!SvYSign[i]){ | |
|                 if(IscModeIsCuStringFlag){ | |
|                   sv_y_abs_minus1[i] | ae(v) |
|                 } | |
|                 sv_x_abs_minus1[i] | ae(v) |
|                 SvXAbsMinus1[i] += SvOffset | |
|               } | |
|               else { | |
|                 sv_x_non_zero_flag[i] | ae(v) |
|                 if (SvXNonZeroFlag[i]){ | |
|                   sv_x_sign[i] | ae(v) |
|                   if(IscModeIsCuStringFlag){ | |
|                     if(!SvXSign[i]){ | |
|                       sv_y_abs_minus1[i] | ae(v) |
|                       SvYAbsMinus1[i] += height−1 | |
|                   }else{ | |
|                     sv_y_abs_minus1[i] | ae(v) |
|                   } | |
|                 } | |
|                 sv_x_abs_minus1[i] | ae(v) |
|               } | |
|               else{ | |
|                 if(IscModeIsCuStringFlag){ | |
|                   sv_y_abs_minus1[i] | ae(v) |
|                   SvYAbsMinus1[i] += height−2 | |
|                 } | |
|               } | |
|             } | |
|           } | |
|         } | |
|     } | |
|     i++ | |
| } | |
| IscPartNum = i | |

In Table 1, the parameter IscModelsCuStringFlag may indicate that the current string is a CU-level string or an ordinary level string. "IscModelsCuStringFlag=1" may represent that the current string is the CU-level string. "IscModelsCuStringFlag=0" may represent that the current string is the ordinary level string. The meaning of the parameter SvOffset_mvy0 may be the same as that of the offset2. The meaning of the parameter SvOffset may be the same as that of the offset1.

In some embodiments, when the current string is a cross-line string, in response to that the SV_X of the current string is less than or equal to 0 and greater than a negative width (i.e., a negative value of a width of a CU corresponding to the current string), and the SV_Y of the current string is less than or equal to −1, an in-string reference may be allowed for the current cross-line string. An SV of the current cross-line string may be (x, y). When x is greater than the negative width and less than or equal to 0 (i.e., −width<x≤0), and y is less than or equal to −1 (i.e., y≤−1), the in-string reference may be allowed for the current cross-line string, which may greatly increase a length of the current cross-line string and reduce the encoding consumption. Specifically, the SV and the string length of the current cross-line string may be encoded according to a normal encoding process during encoding. In order to facilitate the hardware implementation of the decoding end and the parallel operations during decoding, the current cross-line string may need to be split. A splitting rule of the splitting may be that every y lines is split into a string. For example, if the SV of the current cross-line string is (0, −2), and a count of pixel rows crossed by the current cross-line string is 5, the current cross-line string may be split into three strings that respectively include 2 pixel rows, 2 pixel rows, and 1 pixel row. Through the embodiments of SP mentioned above, the compression rate of the video encoding based on string encoding technology may be improved.

In some embodiments, the video encoding in the present disclosure may be used in a screen content scene (SCC)

(e.g., encoding images generated by a computer), a natural image scene (e.g., encoding natural images), and a mixed scene of the SCC and the natural image scene.

Figure 11:
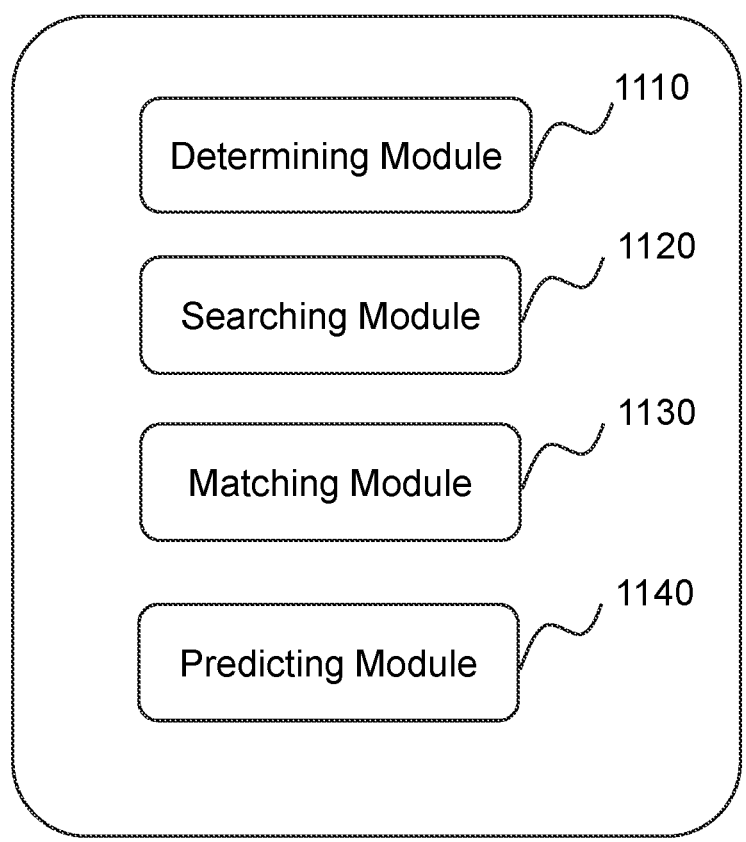
FIG. 11 is an exemplary block diagram illustrating a video encoding system according to some embodiments of the present disclosure.

FIG. 11 is an exemplary block diagram illustrating a video encoding system according to some embodiments of the present disclosure. As shown in FIG. 11, the video encoding system 1100 may include a determining module 1110, a searching module 1120, a matching module 1130, and a predicting module 1140.

The determining module 1110 may be configured to determine a current string in a coding unit (CU) of an image frame. More descriptions regarding the determining of the current string may be found elsewhere in the present disclosure, for example, operation 310 in FIG. 3 and relevant descriptions thereof.

The searching module 1120 may be configured to determine a reference matching pixel of a first pixel in the current string by searching a searching area based on the first pixel. More descriptions regarding the determining of the reference matching pixel may be found elsewhere in the present disclosure, for example, operation 320 in FIG. 3 and relevant descriptions thereof.

The matching module 1130 may be configured to determine a count of matching pixels in each of a plurality of groups, corresponding to matching patterns, of the current string based on the reference matching pixel, the matching patterns, and costs. More descriptions regarding the determining of the count of matching pixels may be found elsewhere in the present disclosure, for example, operation 330 in FIG. 3 and relevant descriptions thereof.

The predicting module 1140 may be configured to determine a target prediction of the current string based on the counts of matching pixels in the plurality of groups corresponding to the matching patterns and the costs. More descriptions regarding the determining of the target prediction of the current string may be found elsewhere in the present disclosure, for example, operation 340 in FIG. 3 and relevant descriptions thereof.

In some embodiments, the video encoding system 1100 may include an encoding module (not shown) configured to encode the current string based on the target prediction. More descriptions regarding the encoding of the current string may be found elsewhere in the present disclosure, for example, FIG. 3 and relevant descriptions thereof.

The modules in the video encoding system 1100 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, two or more of the modules may be combined as a single module, and any one of the modules may be divided into two or more units.

Figure 12:
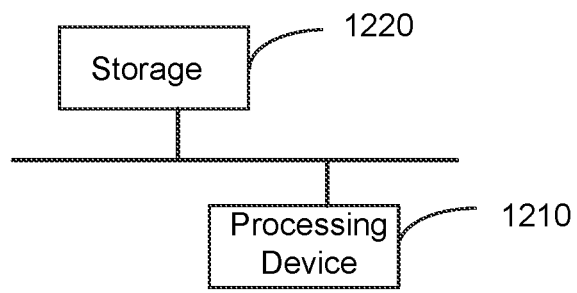
FIG. 12 is a schematic diagram illustrating exemplary video encoding device according to some embodiments of the present disclosure.

FIG. 12 is a schematic diagram illustrating an exemplary video encoding device according to some embodiments of the present disclosure. In some embodiments, the video encoding system 100 and/or the video encoding system 1100 may be implemented by software and/or hardware, and/or may be integrated in the video encoding device 1200.

As shown in FIG. 12, the video encoding device 1200 may include a processing device 1210 (also referred to as a processor). The processing device may be configured to process information and/or data relating to the video encoding to perform one or more functions described in the present disclosure. For example, the processing device 1210 may be configured to implement any one of the embodiments or any combination thereof in the present disclosure.

In some embodiments, the processing device 1210 may include a central processing unit (CPU). In some embodiments, the processing device 1210 may include an integrated circuit chip configured to process signals. In some embodiments, the processing device 1210 may include a general-purpose processor, a digital signal processor (DSP), an application specific integrated circuit (ASIC), a field programmable gate array (FPGA), other programmable logic device, a discrete gate, a transistor logic device, a discrete hardware component, or the like, or any combination thereof. The general-purpose processor may include a microprocessor. In some embodiments, the processing device 1210 may include any conventional processor.

In some embodiments, the video encoding device 1200 may include a storage 1220. The storage 1220 may be configured to store instructions and/or data required for operations of the processing device 1210. In some embodiments, the storage 1220 may include a medium that may store program codes, such as a U disk, a mobile hard disk, a read-only memory (ROM), a random access memory (RAM), a magnetic disk, an optical disk, or the like, or any combination thereof. In some embodiments, the storage 1220 may include terminal devices such as a computer, a server, a mobile phone, a tablet, or the like, or any combination thereof.

Figure 13:
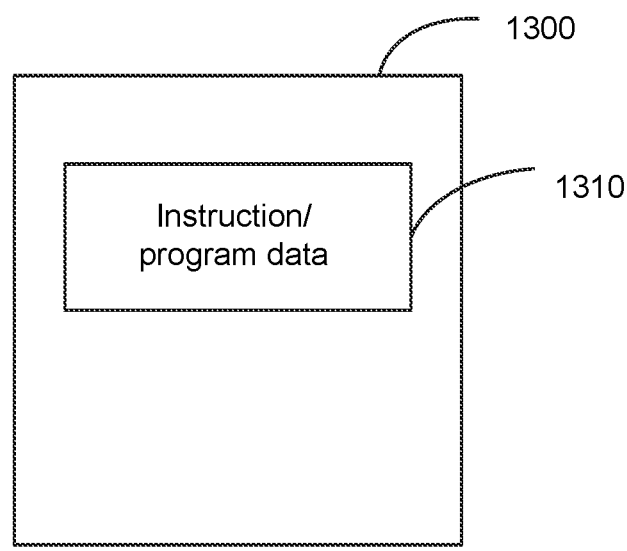
FIG. 13 is a schematic diagram illustrating an exemplary computer-readable storage medium according to some embodiments of the present disclosure.

FIG. 13 is a schematic diagram illustrating an exemplary computer-readable storage medium according to some embodiments of the present disclosure. The computer-readable storage medium 1300 may be configured to store instruction/program data 1310. When the instruction/program data 1310 is executed, any one of the embodiments of the video encoding method may be implemented. In some embodiments, the instruction/program data 1310 may be in a form of a program file and stored in the storage 1220 in a form of a software product. A computer device (e.g., personal computer, a server, or a network device, etc.) or a processor may perform all or part of the operations of the embodiments of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system, comprising:
   at least one storage device including a set of instructions; and
   at least one processor in communication with the at least one storage device, wherein when executing the set of instructions, the at least one processor is directed to perform operations including:
      determining a current string in a coding unit (CU) of an image frame, the current string including one or more pixels;
      determining, based on a first pixel in the current string, a reference matching pixel of the first pixel by searching a searching area, the searching area including a plurality of matching pixels;
      determining, based on the reference matching pixel and matching patterns, a count of matching pixels in each of a plurality of groups, corresponding to the matching patterns, of the current string; and
      determining, based on counts of matching pixels in the plurality of groups corresponding to the matching patterns, a target prediction of the current string;
      wherein the matching patterns include a flip pattern, and the determining the target prediction of the current string includes:
         obtaining at least one flipped matching string by adjusting a position of at least one of matching pixels in the target prediction of the current string based on the flip pattern, the flip pattern including at least one of a symmetric flip pattern, a multi-axis flip pattern, or a complete flip pattern;
         comparing a first cost between the current string and the target prediction of the current string with a second cost between the current string and the at least one flipped matching string; and
         selecting, based on the comparison, one corresponding to the smallest of the first cost and the second cost from the target prediction and the at least one flipped matching string as the target prediction of the current string;
      wherein the flip pattern is the multi-axis flip pattern, and the adjusting the position of at least one of matching pixels in the target prediction of the current string based on the flip pattern includes:
         selecting a plurality of discontinuous matching pixels in a same pixel row of the target prediction of the current string as flip axes;
         flipping a part of matching pixels between two adjacent flip axes in the flip axes according to one of the two adjacent flip axes close the part of pixels; and
         flipping the other part of matching pixels between the two adjacent flip axes according to the other of the two adjacent flip axes.

2. The system of claim 1, wherein the matching patterns include at least one of a horizontal matching pattern, a vertical matching pattern, or a diagonal matching pattern.

3. The system of claim 1, wherein the flip pattern is the symmetric flip pattern, and the adjusting the position of at least one of matching pixels in the target prediction of the current string based on the flip pattern include:
- selecting a matching pixel in the target prediction of the current string as a flip axis;
- flipping one or more pixels in the target prediction located at a first side of the flip axis to a second side of the flip axis; and
- flipping one or more pixels in the target prediction located at the second side of the flip axis to the first side of the flip axis.

4. The system of claim 1, wherein the flip pattern is the complete flip pattern, and the adjusting the position of at least one of matching pixels in the target prediction of the current string based on the flip pattern include:
- reversing completely an order of the matching pixels in the target prediction of the current string.

5. The system of claim 1, wherein the determining the count of matching pixels of the current string includes:
- determining, based on the reference matching pixel, the matching patterns, and costs, the count of matching pixels in each of the plurality of groups, corresponding to the matching patterns, of the current string.

6. The system of claim 5, wherein one of the costs corresponding to the current string is at a CU level and determined by:
- selecting a string vector (SV) of the current string; and
- determining, in response to that the selected SV of the current string is in a historical candidate motion vector list, a bit cost of the SV of the current string using an index of the SV in the historical candidate motion vector list.

7. The system of claim 5, wherein one of the costs corresponding to the current string is at a CU level and determined by weighting a bit cost based on a lamda weighting factor.

8. The system of claim 5, wherein one of the costs corresponding to the current string is at an ordinary level and determined based on a first parameter offset1, wherein the current string at the ordinary level refers to that a length of the current string is not equal to a count of all pixels in the CU corresponding to the current string.

9. The system of claim 5, wherein the determining the count of matching pixels of the current string includes:
- obtaining candidate motion vectors;
- constructing a predicted motion vectors candidate list using the candidate motion vectors;
- determining, based on the reference matching pixel and the matching patterns, a string vector (SV) of the current string using the predicted motion vectors candidate list;
- determining the costs of the SV of the current string; and
- determining the count of matching pixels of the current string based on the costs.

10. The system of claim 9, wherein the candidate motion vectors include at least one of a motion vector in an adjacent domain, a motion vector in a non-adjacent spatial domain, a motion vector during an encoding process, or a preset motion vector, the motion vector including at least one of a block vector or a string vector.

11. The system of claim 9, wherein the candidate motion vectors include motion vectors in a final historical candidate list under a best division manner of a largest coding unit corresponding to the current string and historical candidate lists under other division manners of the largest coding unit.

12. The system of claim 1, wherein the operations further include:
- encoding the current string based on the target prediction.

13. The system of claim 12, wherein the current string is at a CU level, and the encoding the current string based on the target prediction includes:
- obtaining a horizontal component and a vertical component of an SV associated with the target prediction of the current string at the CU level;
- determining whether the vertical component of the SV of the current string is less than 1 and the horizontal component of the SV of the current string is equal to 0;
- in response to determining that the vertical component of the SV of the current string is not less than 1 and/or the horizontal component of the SV of the current string is not equal to 0, determining whether the vertical component of the SV of the current string is non-zero; and
- in response to determining that the vertical component of the SV of the current string is 0, encoding a difference between an absolute value of the horizontal component of the SV of the current string and a second parameter offset2, wherein:
  - in response to that a length of the current string is less than a width of the CU corresponding to the current string, the second parameter offset2 is equal to the length of the current string, and
  - in response to that the length of the current string is greater than or equal to the width of the CU, the second parameter offset2 is equal to the first parameter offset1 plus 1, the first parameter offset1 being less than or equal to the absolute value of the horizontal component of the SV of the current string and the width of the CU.

14. The system of claim 12, wherein the current string is at an ordinary level, the current string at the ordinary level refers to that a length of the current string is not equal to a count of all pixels in the CU corresponding to the current string, and the encoding the current string based on the target prediction includes:
- obtaining a horizontal component and a vertical component of an SV associated with the target prediction of the current string at the ordinary level;
- determining whether the vertical component of the SV of the current string is less than 1 and the horizontal component of the SV of the current string is equal to 0;
- in response to determining that the vertical component of the SV of the current string is not less than 1 and/or the horizontal component of the SV of the current string is not equal to 0, determining whether the vertical component of the SV of the current string is non-zero; and
- in response to determining that the vertical component of the SV of the current string is 0, determining whether an index of a pixel row where a starting position of the current string is located is an odd number;
- in response to determining that the index of the pixel row where the starting position of the current string is located is not an odd number, encoding a difference between an absolute value of the horizontal component of the SV of the current string and a second parameter offset2, wherein:
  - in response to that a length of the current string is less than a width of the CU corresponding to the current string, the second parameter offset2 is equal to the length of the current string, and
  - in response to that the length of the current string is greater than or equal to the width of the CU, the second parameter offset2 is equal to the first parameter offset1 plus 1, the first parameter offset1 being less than or equal to the absolute value of the horizontal component of the SV of the current string and the width of the CU.

15. The system of claim 12, wherein the current string is a cross-line string that includes at least two pixel rows, and the encoding the current string based on the target prediction does not include:
encoding and transmitting a syntactic element corresponding to a unit basis vector of the current string.

16. A method, comprising:
determining a current string in a coding unit (CU) of an image frame, the current string including one or more pixels;
determining, based on a first pixel in the current string, a reference matching pixel of the first pixel by searching a searching area, the searching area including a plurality of matching pixels;
determining, based on the reference matching pixel and matching patterns, a count of matching pixels in each of a plurality of groups, corresponding to the matching patterns, of the current string; and
determining, based on counts of matching pixels in the plurality of groups corresponding to the matching patterns, a target prediction of the current string;
wherein the matching patterns include a flip pattern, and the determining the target prediction of the current string includes:
obtaining at least one flipped matching string by adjusting a position of at least one of matching pixels in the target prediction of the current string based on the flip pattern, the flip pattern including at least one of a symmetric flip pattern, a multi-axis flip pattern, or a complete flip pattern;
comparing a first cost between the current string and the target prediction of the current string with a second cost between the current string and the at least one flipped matching string; and
selecting, based on the comparison, one corresponding to the smallest of the first cost and the second cost from the target prediction and the at least one flipped matching string as the target prediction of the current string;
wherein the flip pattern is the multi-axis flip pattern, and the adjusting the position of at least one of matching pixels in the target prediction of the current string based on the flip pattern includes:
selecting a plurality of discontinuous matching pixels in a same pixel row of the target prediction of the current string as flip axes;
flipping a part of matching pixels between two adjacent flip axes in the flip axes according to one of the two adjacent flip axes close the part of pixels; and
flipping the other part of matching pixels between the two adjacent flip axes according to the other of the two adjacent flip axes.

17. A non-transitory computer readable medium, comprising executable instructions that, when executed by at least one processor, direct the at least one processor to perform a method, the method comprising:
determining a current string in a coding unit (CU) of an image frame, the current string including one or more pixels;
determining, based on a first pixel in the current string, a reference matching pixel of the first pixel by searching a searching area, the searching area including a plurality of matching pixels;
determining, based on the reference matching pixel and matching patterns, a count of matching pixels in each of a plurality of groups, corresponding to the matching patterns, of the current string; and
determining, based on counts of matching pixels in the plurality of groups corresponding to the matching patterns, a target prediction of the current string;
wherein the matching patterns include a flip pattern, and the determining the target prediction of the current string includes:
obtaining at least one flipped matching string by adjusting a position of at least one of matching pixels in the target prediction of the current string based on the flip pattern, the flip pattern including at least one of a symmetric flip pattern, a multi-axis flip pattern, or a complete flip pattern;
comparing a first cost between the current string and the target prediction of the current string with a second cost between the current string and the at least one flipped matching string; and
selecting, based on the comparison, one corresponding to the smallest of the first cost and the second cost from the target prediction and the at least one flipped matching string as the target prediction of the current string;
wherein the flip pattern is the multi-axis flip pattern, and the adjusting the position of at least one of matching pixels in the target prediction of the current string based on the flip pattern includes:
selecting a plurality of discontinuous matching pixels in a same pixel row of the target prediction of the current string as flip axes;
flipping a part of matching pixels between two adjacent flip axes in the flip axes according to one of the two adjacent flip axes close the part of pixels; and
flipping the other part of matching pixels between the two adjacent flip axes according to the other of the two adjacent flip axes.

* * * * *